United States Patent
Miyazaki et al.

(10) Patent No.: US 10,889,701 B2
(45) Date of Patent: Jan. 12, 2021

(54) RESIN COMPOSITION AND RESIN MOLDED ARTICLE

(71) Applicant: Eastman Chemical Company, Kingsport, TN (US)

(72) Inventors: Kana Miyazaki, Minamiashigara (JP); Ryo Tanaka, Minamiashigara (JP); Kenji Yao, Minamiashigara (JP)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 16/265,094

(22) Filed: Feb. 1, 2019

(65) Prior Publication Data

US 2020/0071501 A1 Mar. 5, 2020

(30) Foreign Application Priority Data

Aug. 31, 2018 (JP) ................................. 2018-164061

(51) Int. Cl.
| | | |
|---|---|---|
| *C08L 1/14* | (2006.01) | |
| *C08L 1/12* | (2006.01) | |
| *C08L 67/02* | (2006.01) | |
| *B29K 101/12* | (2006.01) | |
| *C08L 77/00* | (2006.01) | |
| *C08L 69/00* | (2006.01) | |
| *B29C 45/00* | (2006.01) | |

(52) U.S. Cl.
CPC ............ *C08L 1/14* (2013.01); *B29C 45/0001* (2013.01); *C08L 1/12* (2013.01); *C08L 67/02* (2013.01); *C08L 69/00* (2013.01); *C08L 77/00* (2013.01); *B29K 2101/12* (2013.01); *C08L 2205/025* (2013.01); *C08L 2205/03* (2013.01); *C08L 2205/035* (2013.01); *C08L 2205/06* (2013.01); *C08L 2207/02* (2013.01); *C08L 2207/53* (2013.01)

(58) Field of Classification Search
None
See application file for complete search history.

(56) References Cited

U.S. PATENT DOCUMENTS

| | | | | |
|---|---|---|---|---|
| 8,182,734 B1* | 5/2012 | Uradnisheck | ............... | C08J 5/18 264/320 |
| 8,221,574 B2* | 7/2012 | Akhtar | ................... | C09D 5/008 156/247 |
| 2005/0250931 A1* | 11/2005 | Takagi | ...................... | C08J 11/12 528/310 |
| 2015/0119503 A1* | 4/2015 | Ryu | ........................ | C08L 23/10 524/15 |
| 2015/0183973 A1* | 7/2015 | Lee | ........................ | C08L 101/16 524/41 |

FOREIGN PATENT DOCUMENTS

| | | | | |
|---|---|---|---|---|
| JP | 2015-044976 A | | 3/2015 | |
| JP | 6323605 B1 * | | 5/2018 | .............. C08L 23/00 |

OTHER PUBLICATIONS

Machine translation of JP 6323605 B1, retrieved Apr. 2020. (Year: 2020).*
Table: ENGAGE TM Polyolefin Elastomers, POE Ethylene Octene Grades, Handbook of Thermoplastic Elastomrs, 2nd edition, 2014. (Year: 2014).*

* cited by examiner

*Primary Examiner* — Nicole M. Buie-Hatcher
(74) *Attorney, Agent, or Firm* — Robert C. Morriss

(57) ABSTRACT

Provided is a resin composition containing: a resin (A) having a biomass-derived carbon atom; a resin (B) incompatible with the resin (A); and a plasticizer (C), in which a content of the resin (A) is larger than a content of the resin (B), and a glass transition temperature $Tg_{(A)}$ of the resin (A) is higher than a glass transition temperature $Tg_{(B)}$ of the resin (B).

13 Claims, No Drawings

RESIN COMPOSITION AND RESIN MOLDED ARTICLE

CROSS-REFERENCE TO RELATED APPLICATIONS

This application is based on and claims priority under 35 USC 119 from Japanese Patent Application No. 2018-164061 filed on Aug. 31, 2018.

BACKGROUND

Technical Field

The present invention relates to a resin composition and a resin molded article.

Related Art

Conventionally, resin compositions have been provided and used for various purposes. Particularly, the resin compositions are used for various parts and casings of household electric appliances and automobiles. In addition, thermoplastic resin is also used for parts such as office equipment and casings of electronic and electrical equipment.

In recent years, plant-derived resins are used, and examples of conventionally known plant-derived resins include resins having biomass-derived carbon atoms such as cellulose acylate.

For example, Patent Literature 1 discloses "a cellulose ester composition, containing: (A) 100 parts by mass of a cellulose ester; (B) 2 parts by mass to 100 parts by mass of a plasticizer; and (C) 1 part by mass to 10 parts by mass of a thermoplastic elastomer, which is a block copolymer containing an alkyl (meth)acrylate unit".

CITATION LIST

Patent Literature

Patent Literature 1: JP-A-20150944976

SUMMARY

When a resin composition containing a resin having a biomass-derived carbon atom such as a cellulose acylate is used, a plasticizer is added to a resin composition for molding a resin molded article, from the viewpoint of enhancing flowability in heating. However, when a resin composition containing a plasticizer is used, it is not easy to obtain high rigidity in the obtained resin molded article. In addition, the solidification time (so-called cycle time) in molding the resin molded article tends to be long.

Aspects of non-limiting embodiments of the present disclosure relate to provide a resin composition, from which a resin molded article having high rigidity may be obtained and for which a time required for solidification in molding the resin molded article is short, compared with a case where a glass transition temperature $Tg_{(B)}$ of a resin (B) incompatible with a resin (A) is higher than a glass transition temperature $Tg_{(A)}$ of the resin (A) having a biomass-derived carbon atom in a resin composition which contains the resin (A), the resin (B), and a plasticizer (C) and in which a content of the resin (A) is larger than a content of the resin (B).

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a resin composition, containing:
a resin (A) having a biomass-derived carbon atom;
a resin (B) incompatible with the resin (A); and
a plasticizer (C),
wherein a content of the resin (A) is larger than a content of the resin (B), and
a glass transition temperature $Tg_{(A)}$ of the resin (A) is higher than a glass transition temperature $Tg_{(B)}$ of the resin (B).

DETAILED DESCRIPTION

Hereinafter, an exemplary embodiment which is an example of the present invention is described.

In the description, when there are a plurality of kinds of substances corresponding to each component in a subject, the amount of each component in the subject means the total content of a plurality of kinds of substances present in the composition, unless otherwise specified.

The expression "polymer of X" is an expression including not only a homopolymer of X, but also a copolymer of X and a monomer other than X. Similarly, the expression "a copolymer of X and Y" is an expression including a copolymer of X and Y (hereinafter also referred to as "single copolymer" for convenience), but also a copolymer of X, Y, and a monomer other than X and Y.

In addition, the resin (A) having a biomass-derived carbon atom, the resin (B) and the plasticizer (C) also referred to as component (A), component (B) and component (C), respectively.

<Resin Composition>

The resin composition according to the exemplary embodiment contains a resin (A) having a biomass-derived carbon atom (hereinafter simply referred to as "bio-resin (A)"), a resin (B) incompatible with the resin (A), and a plasticizer (C).

The mass content of the bio-resin (A) is larger than the mass content of the resin (B), and the glass transition temperature $Tg_{(A)}$ of the bio-resin (A) is higher than the glass transition temperature $Tg_{(B)}$ of the resin (B).

According to the resin composition having the above configuration of the exemplary embodiment, a resin composition is provided, from which a resin molded article having high rigidity may be obtained and for which a time required for solidification (cycle time) in molding the resin molded article is short.

The reasons for this are presumed as follows.

The plasticizer (C) is added to the resin in order to improve the flowability. When the resin composition containing the bio-resin (A), the resin (B) and the plasticizer (C) are heated to be molten, the plasticizer (C) is easily dispersed in the entire resin composition, and thus the flowability is improved. Whereas, when the temperature of the resin composition after heating decreases, the bio-resin (A) having a glass transition temperature higher than that of the resin (B) begins to solidify first, and the plasticizer (C) is easily present in the more highly flowable resin (B). Since the plasticizer (C) is present on the resin (B) side, that is, the amount of the plasticizer (C) present in the bio-resin (A) decreases, increase in viscosity of the bio-resin (A) is accelerated. In addition, since the content of the bio-resin (A) is higher than that of the resin (B) in the resin composition, the progress of solidification accelerates as a whole of the resin composition, and accordingly the solidification time (cycle time) is shortened.

Further, since in the state where the resin composition is solidified, the plasticizer (C) is present on the resin (B) side and the plasticization of the bio-resin (A) due to the plasticizer (C) is suppressed, the rigidity of the obtained resin molded article is improved.

Accordingly, it is presumed that in the exemplary embodiment a resin composition is provided, from which a resin molded article having high rigidity may be obtained and for which a time required for solidification (cycle time) in molding the resin molded article is short.

Further, according to the resin composition of the exemplary embodiment, a resin molded article having high surface impact strength may be obtained.

This is because in the resin composition (i.e., a resin molded article) solidified after being heated, the plasticizer (C) is present on the resin (B) side having a lower glass transition temperature, thus interface cracking is suppressed even when an impact is applied, and accordingly the surface impact strength of the resin molded article is increased.

Contents of Bio-Resin (A), Resin (B) and Plasticizer (C)

The content of the bio-resin (A) is larger than that of the resin (B). When the content of the bio-resin (A) is larger, the solidification time (cycle time) is shortened and the rigidity of the resin molded article is improved.

Glass Transition Temperatures of Bio-Resin (A) and Resin (B)

The glass transition temperature of the bio-resin (A) is higher than that of the resin (B). When the glass transition temperature of the bio-resin (A) is higher, the solidification time (cycle time) is shortened and the rigidity of the resin molded article is improved.

The glass transition temperature $Tg_{(A)}$ of the bio-resin (A) is not particularly limited and is preferably, for example, 50° C. to 200° C., and more preferably 80° C. to 170° C.

The glass transition temperature $Tg_{(B)}$ of the resin (B) is not particularly limited and is preferably, for example, 0° C. to 150° C., and more preferably 30° C. to 120° C.

Glass Transition Temperatures of Bio-Resin (A) and Mixture of Bio-Resin (A) and Plasticizer (C)

The difference $[Tg_{(A)}-Tg_{(A+C)}]$ between the glass transition temperature $Tg_{(A)}$ of the bio-resin (A) and the glass transition temperature $Tg_{(A+C)}$ of a mixture obtained by mixing 10 parts by mass of the plasticizer (C) with 90 parts by mass of the bio-resin (A) is preferably 25° C. to 60° C. The difference $[Tg_{(A)}-Tg_{(A+C)}]$ is more preferably 30° C. to 55° C., and still more preferably 35° C. to 50° C.

A difference $[Tg_{(A)}-Tg_{(A+C)}]$ of 25° C. or higher indicates that the plasticizer (C) has affinity for the bio-resin (A), and accordingly high flowability is obtained when the resin composition is heated, and the moldability of the resin molded article is excellent.

A difference $[Tg_{(A)}-Tg_{(A+C)}]$ of 60° C. or lower indicates that the affinity of the plasticizer (C) for the bio-resin (A) is not excessively high, and accordingly the solidification time (cycle time) is easily shortened and the rigidity of the resin molded article is easily improved. This is because the plasticizer (C) is easily present on the resin (B) side when the temperature of the resin composition after heating decreases.

Glass Transition Temperatures of Resin (B) and Mixture of Resin (A) and Plasticizer (C)

The difference $[Tg_{(B)}-Tg_{(B-C)}]$ between the glass transition temperature $Tg_{(B)}$ of the resin (B) and the glass transition temperature $Tg_{(B+C)}$ of a mixture obtained by mixing 10 parts by mass of the plasticizer (C) with 90 parts by mass of the resin (B) is 15° C. to 40° C.

The difference $[Tg_{(B)}-Tg_{(B-C)}]$ between the glass transition temperature $Tg_{(B)}$ of the resin (B) and the glass transition temperature $Tg_{(B+C)}$ of a mixture obtained by mixing 10 parts by mass of the plasticizer (C) with 90 parts by mass of the resin (B) is preferably 15° C. to 40° C. The difference $[Tg_{(B)}-Tg_{(B+C)}]$ is more preferably 18° C. to 35° C., and still more preferably 21° C. to 30° C.

A difference $[Tg_{(B)}-Tg_{(B+C)}]$ of 15° C. or higher indicates that the plasticizer (C) has affinity for resin (B), and accordingly the solidification time (cycle time) is easily shortened and the rigidity of the resin molded article is easily improved. This is because the plasticizer (C) is easily present on the resin (B) side when the temperature of the resin composition after heating decreases.

A difference $[Tg_{(B)}-Tg_{(B+C)}]$ of 40° C. or lower indicates that the affinity of the plasticizer (C) for the resin (B) is not excessively high, and accordingly high flowability is obtained when the resin composition is heated, and the moldability of the resin molded article is excellent. This is because the plasticizer (C) is not present toward the resin (B) side and is also easily present in the bio-resin (A) in the resin composition being heated, and as a result, the flowability of the resin composition as a whole is improved.

The ratio of the difference $[Tg_{(B)}-Tg_{(B+C)}]$ to the difference $[Tg_{(A)}-Tg_{(A+C)}]$, that is, $[Tg_{(B)}-Tg_{(B+C)}]/[Tg_{(A)}-Tg_{(A+C)}]$, is preferably 0.4 to 0.85, more preferably 0.45 to 0.8, and still more preferably 0.5 to 0.75 from the viewpoint of easily shortening the solidification time (cycle time) and from the viewpoint of easily improving the rigidity of the resin molded article.

The glass transition temperatures of the bio-resin (A), the resin (B), the mixture of the bio-resin (A) and the plasticizer (C), and the mixture of the resin (B) and the plasticizer (C) are measured based on a DSC curve obtained by differential scanning calorimetry (DSC). Specifically, the glass transition temperature may be obtained by "intermediate point glass transition temperature" described in JIS K7121-1987 "Method for measuring plastic transition temperature" for determining the glass transition temperature.

Hereinafter, the components of the resin composition according to the exemplary embodiment are described in detail.

[Resin (A) Having Biomass-derived Carbon Atom: Component (A)]

The resin composition according to the exemplary embodiment contains a resin (A) having a biomass-derived carbon atom.

The resin (A) having a biomass-derived carbon atom is not particularly limited, and a known resin having a biomass-derived carbon atom is used.

Further, the resin (A) having a biomass-derived carbon atom may not necessarily be entirely derived from biomass as long as at least a part thereof has a biomass-derived structure. Specifically, for example, as the cellulose acylate to be described later, the cellulose structure may be derived from biomass and the acylate structure may be derived from petroleum.

The "resin having a biomass-derived carbon atom" in the exemplary embodiment is a resin having at least carbon atoms derived from organic resources derived from living things excluding fossil resources, and as described later, based on the provisions of ASTM D6866:2012, the presence of biomass-derived carbon atoms is indicated by the abundance of $^{14}C$.

The content of the biomass-derived carbon atom in the resin composition according to the exemplary embodiment defined in ASTM D6866:2012 is preferably 20 mass % or more, more preferably 30 mass % or more, still more preferably 35 mass % or more, and particularly preferably 40 mass % to 100 mass % based on a total amount of carbon atoms in the resin composition, from the viewpoint of obtaining rigidity in the obtained resin molded article.

In the exemplary embodiment, the method for measuring the content of the biomass-derived carbon atom in the resin composition includes measuring the content of $^{14}C$ in the total amount of carbon atoms in the resin composition, and calculating the content of the biomass-derived carbon atoms based on the provisions of ASTM D6866:2012.

Examples of the resin (A) having a biomass-derived carbon atom include a cellulose acylate, a biomass-derived polyester, a biomass-derived polyolefin, a biomass-derived polyethylene terephthalate, a biomass-derived polyamide, polytrimethylene terephthalate (PTT), polybutylene succinate (PBS), phosphatidyl glycerol (PG), an isosorbide polymer, an acrylic acid modified rosin or the like.

The biomass-derived polyester refers to a polyester resin having a biomass-derived carbon atom, and examples thereof include a resin having a biomass-derived carbon atom which is a "polyester resin" listed in Resin (B) (Component (B)).

The biomass-derived polyester is preferably an aliphatic polyester, and examples thereof include a resin having a biomass-derived carbon atom which is an "aliphatic polyester resin" listed in Resin (B) (Component (B)). Of these, the biomass-derived polyester is preferably a polyhydroxyalkanoate (for example, a polyhydroxyalkanoate listed in Resin (B) (Component (B))), and more preferably a polylactic acid.

Of these, the resin (A) having a biomass-derived carbon atom is preferably at least one selected from the group consisting of a cellulose acylate and an aliphatic polyester, and more preferably a cellulose acylate, from the viewpoint of obtaining rigidity of the obtained resin molded article.

—Cellulose Acylate—

The cellulose acylate is a cellulose derivative in which at least a part of hydroxyl groups in the cellulose are substituted (acylated) with an acyl group. The acyl group is a group having a structure of $-CO-R^{Ac}$ ($R^{Ac}$ represents a hydrogen atom or a hydrocarbon group).

The cellulose acylate is, for example, a cellulose derivative represented by the following General Formula (CA).

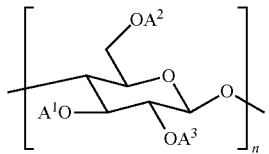

General Formula (CA)

In the General Formula (CA), $A^1$, $A^2$ and $A^3$ each independently represent a hydrogen atom or an acyl group, and n represents an integer of 2 or more. However, at least a part of n $A^1$, n $A^2$ and n $A^3$ represents an acyl group. All of n $A^1$ in the molecule may be the same, partly the same or different from each other. Similarly, all of n $A^2$ and n $A^3$ in the molecule may be the same, partly the same or different from each other.

The hydrocarbon group in the acyl group represented by $A^1$, $A^2$ and $A^3$ may be linear, branched or cyclic, and is preferably linear or branched, and more preferably linear.

The hydrocarbon group in the acyl group represented by $A^1$, $A^2$ and $A^3$ may be a saturated hydrocarbon group or an unsaturated hydrocarbon group, and more preferably a saturated hydrocarbon group.

The acyl group represented by $A^1$, $A^2$ and $A^3$ is preferably an acyl group having 1 to 6 carbon atoms. That is, the cellulose acylate preferably has an acyl group with 1 to 6 carbon atoms. A resin molded article excellent in rigidity may be more easily obtained from the cellulose acylate having an acyl group with 1 to 6 carbon atoms, than a cellulose acylate having an acyl group with 7 or more carbon atoms.

The acyl group represented by $A^1$, $A^2$ and $A^3$ may be a group in which a hydrogen atom in the acyl group is substituted with a halogen atom (e.g., a fluorine atom, a bromine atom and an iodine atom), an oxygen atom, a nitrogen atom or the like, and is preferably unsubstituted.

Examples of the acyl group represented by $A^1$, $A^2$ and $A^3$ include a formyl group, an acetyl group, a propionyl group, a butyryl group (a butanoyl group), a propenoyl group, and a hexanoyl group. Of these, the acyl group is preferably an acyl group having 2 to 4 carbon atoms, and more preferably an acyl group having 2 or 3 carbons, from the viewpoints of obtaining moldability of the resin composition and rigidity of the resin molded article.

Examples of the cellulose acylate include a cellulose acetate (cellulose monoacetate, cellulose diacetate (DAC), and cellulose triacetate), a cellulose acetate propionate (CAP), and a cellulose acetate butyrate (CAB).

The cellulose acylate is preferably cellulose acetate propionate (CAP) and cellulose acetate butyrate (CAB), and more preferably cellulose acetate propionate (CAP), from the viewpoint of obtaining rigidity in the obtained resin molded article.

The cellulose acylate may be used alone, or may be used in combination of two or more thereof.

The cellulose acylate preferably has a weight-average polymerization degree of 200 to 1000, more preferably 500 to 1000, and still more preferably 600 to 1000 from the viewpoints of obtaining moldability of the resin composition and rigidity in the obtained resin molded article.

The weight-average polymerization degree of the cellulose acylate is determined from the weight average molecular weight (Mw) by the following procedures.

First, the weight average molecular weight (Mw) of the cellulose acylate is measured in terms of polystyrene by a gel permeation chromatography apparatus (GPC apparatus: HLC-8320 GPC manufactured by Tosoh Corporation, column: TSK gel α-M) using tetrahydrofuran.

Subsequently, the polymerization degree of the cellulose acylate is determined by dividing by the structural unit molecular weight of the cellulose acylate. For example, in a case where the substituent of the cellulose acylate is an acetyl group, the structural unit molecular weight is 263 when the degree of substitution is 2.4 and is 284 when the degree of substitution is 2.9.

The weight average molecular weight (Mw) of the resin in the exemplary embodiment is also measured by the same method as the method for measuring the weight average molecular weight of the cellulose acylate.

The cellulose acylate preferably has a degree of substitution of 2.1 to 2.9, more preferably 2.2 to 2.9, still more preferably 2.3 to 2.9, and particularly preferably 2.6 to 2.9, from the viewpoints of obtaining moldability of the resin composition and rigidity in the obtained resin molded article.

In the cellulose acetate propionate (CAP), a ratio of the degree of substitution of the acetyl group to the propionyl group (acetyl group/propionyl group) is preferably 0.01 to 1, and more preferably 0.05 to 0.1, from the viewpoints of obtaining moldability of the resin composition and rigidity in the obtained resin molded article.

The CAP preferably satisfies at least one of the following (1), (2), (3) and (4), more preferably satisfies the following (1), (3) and (4), and still more preferably satisfies the following (2), (3) and (4). (1) When measured by the GPC method using tetrahydrofuran as a solvent, the weight average molecular weight (Mw) in terms of polystyrene is 160,000 to 250,000, and a ratio Mn/Mz of a number average molecular weight (Mn) in terms of polystyrene to a Z average molecular weight (Mz) in terms of polystyrene is 0.14 to 0.21. (2) When measured by the GPC method using tetrahydrofuran as a solvent, the weight average molecular weight (Mw) in terms of polystyrene is 160,000 to 250,000, a ratio Mn/Mz of a number average molecular weight (Mn) in terms of polystyrene to a Z average molecular weight (Mz) in terms of polystyrene is 0.14 to 0.21, and a ratio Mw/Mz of a weight average molecular weight (Mw) in terms of polystyrene to the Z average molecular weight (Mz) in terms of polystyrene is 0.3 to 0.7. (3) When measured with a Capirograph at a condition of 230° C. according to ISO 11443:1995, a ratio η1/η2 of a viscosity η1 (Pa·s) at a shear rate of 1216 (/sec) to a viscosity η2 (P·s) at a shear rate of 121.6 (/sec) is 0.1 to 0.3. (4) When a small square plate test piece (D11 test piece specified by JIS K7139:2009, 60 mm×60 mm, thickness 1 mm) obtained by injection molding of the CAP is allowed to stand in an atmosphere at a temperature of 65° C. and a relative humidity of 85% for 48 hours, both an expansion coefficient in an MD direction and an expansion coefficient in a TD direction are 0.4% to 0.6%. Here, the MD direction means the length direction of the cavity of the mold used for injection molding, and the TD direction means the direction orthogonal to the MD direction.

In the cellulose acetate butyrate (CAB), a ratio of degree of substitution of the acetyl group to the butyryl group (acetyl group/butyryl group) is preferably 0.05 to 3.5, and more preferably 0.5 to 3.0 from the viewpoints of obtaining moldability of the resin composition and rigidity in the obtained resin molded article.

The degree of substitution of the cellulose acylate is an index indicating the degree to which the hydroxyl group of cellulose is substituted with an acyl group. That is, the degree of substitution is an index indicating the degree of acylation of the cellulose acylate. Specifically, the degree of substitution means the intramolecular average of the number of substitution in which three hydroxyl groups in a D-glucopyranose unit of the cellulose acylate are substituted with the acyl group. The degree of substitution is determined from an integrated ratio of peaks of a cellulose-derived hydrogen atom and an acyl group-derived hydrogen atom with $^1$H-NMR (JMN-ECA, manufactured by JEOL RESONANCE Co., Ltd.).

The resin (A) having a biomass-derived carbon atom may be used alone, or may be used in combination of two or more thereof.

[Resin (B): Component (B)]

The resin (B) incompatible with the resin (A) is described.

Here, "incompatible" is defined as the appearance of "extrapolated glass transition starting temperature", described in JIS K7121-1987 "Method for measuring plastic transition temperature" for determining the glass transition temperature, derived from a resin (A), and a resin (B) and two or more points appearing when a blend of resin (B)/resin (A)=30/70 (mass ratio) prepared by a known method (such as melt kneading and solution casting) is subjected to differential scanning calorimetry (DSC). When the difference between the glass transition temperatures of the resin (A) and the resin (B) is small and it is difficult to make a judgment by the above method, a transmission electron microscope image of the blend, a scanning probe microscope image and the like are acquired, and the phase separation structure derived from the resin (A) and the resin (B) is observed.

Examples of the resin (B) include a polyester resin, a poly(meth)acrylate compound, a styrene-acrylonitrile copolymer, a polyamide resin, or the like.

Of these, a polyester resin and a poly(meth)acrylate compound are preferred.

—Polyester Resin—

The polyester resin is, for example, a polymer of hydroxyalkanoate (hydroxyalkanoic acid), a polycondensate of a polyvalent carboxylic acid and a polyhydric alcohol, and a ping-opening polycondensate of cyclic lactam.

The polyester resin is preferably an aliphatic polyester resin. Examples of the aliphatic polyester include a polyhydroxyalkanoate (a polymer of hydroxyalkanoate), a polycondensate of an aliphatic diol and an aliphatic carboxylic acid, or the like.

Of these, the polyester resin is preferably a polyhydroxyalkanoate from the viewpoint of obtaining the rigidity of the obtained resin molded article.

The polyester resin may be used alone, or may be used in combination of two or more thereof.

Examples of the polyhydroxyalkanoate include a compound having a structural unit represented by General Formula (PHA).

In the compound having a structural unit represented by the General Formula (PHA), both ends of the polymer chain (main chain end) may be a carboxyl group, or only one end may be a carboxyl group and the other end may be another group (e.g., a hydroxyl group).

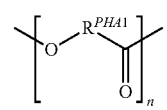

General Formula (PHA)

In the General Formula (PHA), $R^{PHA1}$ represents an alkylene group having 1 to 10 carbon atoms. n represents an integer of 2 or more.

In the General Formula (PHA), the alkylene group represented by $R^{PHA1}$ is preferably an alkylene group having 3 to 6 carbon atoms. The alkylene group represented by $R^{PHA1}$ may be linear or branched, but is preferably branched.

Here, in the General Formula (PHA), the expression that $R^{PHA1}$ represents an alkylene group means that: 1) a [O—$R^{PHA1}$—C(=O)—] structure is contained when $R^{PHA1}$ represents the same alkylene group; and 2) that a plurality of [O—$R^{PHA1}$—C(=O)—] structures (i.e., a [O—$R^{PHA1A}$—C(=O)—][O—$R^{PHA1B}$—C(=O)—] structure) are contained when $R^{PHA1}$ represents different alkylene groups ($R^{PHA1}$ is an alkylene group having a different carbon number or branching)).

That is, the polyhydroxyalkanoate may be a homopolymer of one hydroxyalkanoate (hydroxyalkanoic acid) or a copolymer of two or more hydroxyalkanoates (hydroxyalkanoic acids).

In the General Formula (PHA), the upper limit of n is not particularly limited, and is, for example, 20,000 or less. The range of n is preferably 500 to 10,000, and more preferably 1,000 to 8,000.

Examples of the polyhydroxyalkanoate include a homopolymer of a hydroxyalkanoic acid (such as Lactic acid, 2-hydroxybutyric acid, 3-hydroxybutyric acid, 4-hydroxybutyric acid, 2-hydroxy-3-methylbutyric acid, 2-hydroxy-3,3-dimethylbutyric acid, 3-hydroxyvaleric acid, 4-hydroxyvaleric acid, 5-hydroxyvaleric acid, 3-hydroxyhexanoic acid, 2-hydroxyhexanoic acid, 2-hydroxyisohexanoic acid, 6-hydroxyhexanoic acid, 3-hydroxypropionic acid, 3-hydroxy-2,2-dimethylpropionic acid, 3-hydroxyhexanoic acid, and 2-hydroxy-n-octanoic acid), or a copolymers of these two or more hydroxyalkanoic acids.

Of these, from the viewpoint of suppressing reduction in transparency and improving rigidity of the obtained resin molded article, the polyhydroxyalkanoate is preferably a homopolymer of a branched hydroxyalkanoic acid having 2 to 4 carbon atoms and a homopolymer of a branched hydroxyalkanoic acid having 2 to 4 carbon atoms and a branched hydroxyalkanoic acid having 5 to 7 carbon atoms, more preferably a homopolymer of a branched hydroxyalkanoic acid having 3 carbon atoms (i.e., a polylactic acid) and a homopolymer of 3-hydroxybutyric acid and 3-hydroxyhexanoic acid (i.e., polyhydroxybutyrate hexanoate), and still more preferably a homopolymer of a branched hydroxyalkanoic acid having 3 carbon atoms (i.e., a polylactic acid).

The number of carbon atoms of the hydroxyalkanoic acid is a number including the carbon of the carboxyl group.

The polylactic acid is a polymer compound in which lactic acid is polymerized by an ester bond.

Examples of the polylactic acid include a block copolymer containing a homopolymer of L-lactic acid, a homopolymer of D-lactic acid, and a polymer of at least one of L-lactic acid and D-lactic acid, and a graft copolymer containing a polymer of at least one of L-lactic acid and D-lactic acid.

Examples of the "compound copolymerizable with L-lactic acid or D-lactic acid" include: polyvalent carboxylic acids such as glycolic acid, dimethyl glycolic acid, 3-hydroxybutyric acid, 4-hydroxybutyric acid, 2-hydroxypropanoic acid, 3-hydroxypropanoic acid, 2-hydroxyvaleric acid, 3-hydroxyvaleric acid, 4-hydroxyvaleric acid, axalic acid, malonic acid, succinic acid, glutaric acid, adipic acid, pimelic acid, azelaic acid, sebacic acid, undecanedioic acid, dodecanedioic acid, and terephthalic acid and anhydrides thereof; polyhydric alcohols such as ethylene glycol, diethylene glycol, triethylene glycol, 1,2-propanediol, 1,3-propanediol, 1,3-butanediol, 1,4-butanediol, 2,3-butanediol, 1,5-pentanediol, 1,6-hexanediol, 1,9-nonanediol, 3-methyl-1,5-pentanediol, neopentyl glycol, tetramethylene glycol, and 1,4-hexanedimethanol; polysaccharides such as a cellulose; aminocarboxylic acids such as an α-amino acid; hydroxy carboxylic acids such as 5-hydroxyvaleric acid, 2-hydroxycaproic acid, 3-hydroxycaproic acid, 4-hydroxycaproic acid, 5-hydroxycaproic acid, 6-hydroxycaproic acid, 6-hydroxymethylcaproic acid, and mandelic acid; cyclic esters such as glycolide, β-methyl-δ-valerolactone, γ-valerolactone, and ε-caprolactone; or the like.

It is known that the polylactic acid may be produced by a lactide method via lactide; a direct polymerization method in which lactic acid is heated under reduced pressure in a solvent and polymerized while removing water; or the like.

In the polyhydroxybutyrate hexanoate, the copolymerization ratio of 3-hydroxyhexanoic acid (3-hydroxyhexanoate) to the copolymer of 3-hydroxybutyric acid (3-hydroxybutyrate) and 3-hydroxyhexanoic acid (3-hydroxyhexanoate) is preferably 3 mol % to 20 mol %, more preferably 4 mol % to 15 mol %, and still more preferably 5 mol % to 12 mol %, from the viewpoint of obtaining the rigidity of the resin molded article.

In the method of measuring the copolymerization ratio of 3-hydroxyhexanoic acid (3-hydroxyhexanoate), the hexanoate ratio is calculated from integral values of peaks derived from hexanoate end and butyrate end using $^1$H-NMR.

The polyester resin preferably has a weight average molecular weight (Mw) of 10,000 to 1,000,000 (preferably 50,000 to 800,000, and more preferably 100,000 to 600,000) from the viewpoint of obtaining the rigidity of the resin molded article.

The weight average molecular weight (Mw) of the polyester resin is a value measured by gel permeation chromatography (GPC). Specifically, the molecular weight measurement by GPC is performed with a chloroform solvent using column TSK gel GMHHR-M+TSK gel GMHHR-M (7.8 mm ID 30 cm) manufactured by Tosoh Corporation, and using HLC-8320 GPC manufactured by Tosoh Corporation as a measuring device. Then, the weight average molecular weight (Mw) is calculated from this measurement result using a molecular weight calibration curve prepared from a monodisperse polystyrene standard sample.

—Poly(meth)acrylate Compound—

The poly(meth)acrylate compound is a compound (resin) containing 50 mass % or more (preferably 70 mass % or more, more preferably 90 mass %, and still more preferably 100 mass %) of a structural unit derived from an alkyl (meth)acrylate.

The poly(meth)acrylate compound may be a compound (resin) containing a structural unit derived from a monomer other than a (meth)acrylate.

The structural unit (unit derived from a monomer) of the poly(meth)acrylate compound may be used alone, or may be used in combination of two or more thereof.

The poly(meth)acrylate compound may be used alone, or may be used in combination of two or more thereof.

Examples of the alkyl (meth)acrylate include methyl (meth)acrylate, ethyl (meth)acrylate, n-propyl (meth)acrylate, n-butyl (meth)acrylate, n-pentyl (meth)acrylate, n-hexyl (meth)acrylate, n-heptyl (meth)acrylate, n-octyl (meth)acrylate, n-decyl (meth)acrylate, isopropyl (meth)acrylate, isobutyl (meth)acrylate, t-butyl (meth)acrylate, isopentyl (meth)acrylate, amyl (meth)acrylate, neopentyl (meth)acrylate, isohexyl (meth)acrylate, isoheptyl (meth)acrylate, isooctyl (meth)acrylate, 2-ethylhexyl (meth)acrylate, octyl (meth)acrylate, decyl (meth)acrylate, cyclohexyl (meth)acrylate, dicyclopentanyl (meth)acrylate, or the like.

Of these, the alkyl (meth)acrylate is preferably an alkyl (meth)acrylate having an alkyl chain of 1 to 8 carbon atoms (preferably 1 to 4 carbon atoms, more preferably 1 to 2 carbon atoms, and still more preferably 1 carbon atom) from the viewpoint of obtaining the rigidity of the obtained resin molded article.

That is, the poly(meth)acrylate compound is preferably a polymer containing 50 mass % or more (preferably 70 mass % or more, more preferably 90 mass %, and still more preferably 100 mass %) of a structural unit derived from an alkyl (meth)acrylate having an alkyl chain of 1 to 8 carbon atoms (preferably 1 to 4 carbon atoms, more preferably 1 to 2 carbon atoms, and still more preferably 1 carbon atom).

The poly(meth)acrylate compound is preferably a polymer having 100 mass % of a structural unit derived from an alkyl (meth)acrylate having an alkyl chain of 1 to 8 carbon atoms (preferably 1 to 4 carbon atoms, more preferably 1 to 2 carbon atoms, and still more preferably 1 carbon atom). That is, the poly(meth)acrylate compound is preferably an alkyl poly(meth)acrylate having an alkyl chain of 1 to 8 carbon atoms (preferably 1 to 4 carbon atoms, more preferably 1 to 2 carbon atoms, and still more preferably 1 carbon atom). The alkyl poly(meth)acrylate having an alkyl chain of 1 carbon atom is preferably polymethylmethacrylate.

Examples of the monomer other than the (meth)acrylate in the poly(meth)acrylate compound include:

styrene compounds ((monomers having styrene skeleton, for example, a styrene, an alkyl substituted styrene (such as α-methylstyrene, 2-methylstyrene, 3-methylstyrene, 4-methylstyrene, 2-ethylstyrene, 3-ethylstyrene, and 4-ethylstyrene), a halogen-substituted styrene (such as 2-chlorostyrene, 3-chlorostyrene, and 4-chlorostyrene), a vinyl naphthalene (such as 2-vinyl naphthalene), and a hydroxystyrene (such as 4-ethenylphenol));

unsaturated dicarboxylic anhydrides ("compounds having an ethylenic double bond and a dicarboxylic acid anhydride group" such as maleic anhydride, itaconic anhydride, glutaconic anhydride, citraconic anhydride, and aconitic anhydride);

or the like.

The weight average molecular weight (Mw) of the poly (meth)acrylate compound is not particularly limited, and is preferably 15,000 to 120,000 (preferably more than 20,000 and 100,000 or less, more preferably 22,000 to 100,000, and still more preferably 25,000 to 100,000).

Particularly, the weight average molecular weight (Mw) of the poly(meth)acrylate compound is preferably less than 50,000, more preferably 40,000 or less, and still more preferably 35,000 or less from the viewpoint of obtaining the rigidity of the obtained resin molded article. The weight average molecular weight (Mw) of the poly(meth)acrylate compound is preferably 15,000 or more.

The weight average molecular weight (Mw) of the poly (meth)acrylate compound is a value measured by gel permeation chromatography (GPC). Specifically, the molecular weight measurement by GPC is performed with a tetrahydrofuran solvent using HLC-8320 GPC manufactured by Tosoh Corporation as a measuring device, using a column TSK gel ion-M manufactured by Tosoh Corporation. Then, the weight average molecular weight (Mw) is calculated from this measurement result using a molecular weight calibration curve prepared from a monodisperse polystyrene standard sample.

[Plasticizer (C): Component (C)]

Examples of the plasticizer (C) include a cardanol compound, an ester compound other than an ester compound (E) to be described later, camphor, a metal soap, a polyol, a polyalkylene oxide, or the like. The plasticizer (C) is preferably a cardanol compound or an ester compound other than the ester compound (E) to be described later from the viewpoint of obtaining the rigidity of the resin molded article.

The plasticizer (C) may be used alone, or may be used in combination of two or more thereof.

The plasticizer (C) is preferably a cardanol compound or an ester compound other than the ester compound (E) from the viewpoint of easily obtaining an effect of improving the toughness by adding the ester compound (E). Hereinafter, the cardanol compound and the ester compound suitable as the plasticizer (C) are specifically described.

—Cardanol Compound—

The cardanol compound refers to a component (e.g., a compound represented by the following structural formulas (c-1) to (c-4)) contained in a compound naturally derived from cashews or a derivative derived from the above components.

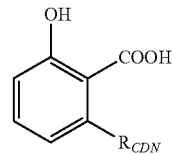

(c-1)

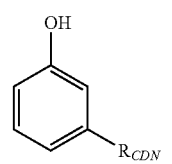

(c-2)

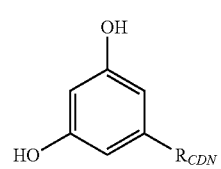

(c-3)

(c-4)

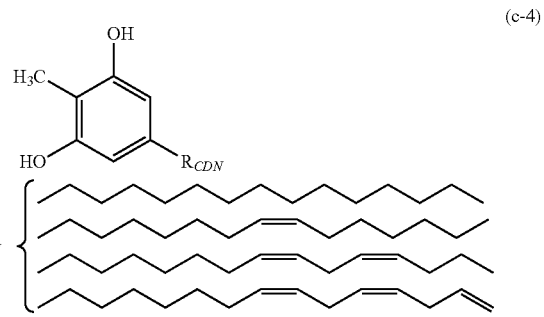

The cardanol compound may be used alone, or may be used in combination of two or more thereof.

The resin composition according to the exemplary embodiment may contain, as the cardanol compound, a mixture of compounds naturally derived from cashews (hereinafter also referred to as "cashew-derived mixture").

The resin composition according to the exemplary embodiment may contain a derivative from the cashew-derived mixture as the cardanol compound. Examples of the derivative from the cashew-derived mixture include the following mixtures or pure substances.

Mixture prepared by adjusting the composition ratio of each component in the cashew-derived mixture Pure substance obtained by isolating only a specific component from the cashew-derived mixture Mixture containing a modified product obtained by modifying components in the cashew-derived mixture Mixture containing a polymer obtained by polymerizing a component in the cashew-derived mixture Mixture containing a modified polymer obtained by modifying and polymerizing a component in the cashew-derived mixture Mixture containing a modified product obtained by further modifying the components in the mixture whose composition ratio is adjusted Mixture containing a polymer obtained by further polymerizing the component in the mixture whose composition ratio is adjusted Mixture containing a modified polymer obtained by further modifying and polymerizing the component in the mixture whose composition ratio is adjusted Modified product obtained by further modifying the isolated pure substance Polymer obtained by further polymerizing the isolated pure substance Modified polymer obtained by further modifying and polymerizing the isolated pure substance Here, the pure substance includes a multimer such as a dimer and a trimer.

The cardanol compound is preferably a compound being at least one selected from the group consisting of a compound represented by a General Formula (CDN1) and a polymer obtained by polymerizing a compound represented by the General Formula (CDN1), from the viewpoint of obtaining the rigidity of the resin molded article.

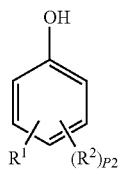

General Formula (CDN1)

In the General Formula (CDN1), $R^1$ represents an alkyl group optionally having a substituent, or an unsaturated aliphatic group optionally having a double bond and a substituent. $R^2$ represents a hydroxy group, a carboxy group, an alkyl group optionally having a substituent, or an unsaturated aliphatic group optionally having a double bond and a substituent. P2 represents an integer of 0 to 4. When P2 is 2 or more, a plurality of $R^2$ may be the same group or different groups.

In the General Formula (CDN1), the alkyl group optionally having a substituent represented by $R^1$ is preferably an alkyl group having 3 to 30 carbon atoms, more preferably an alkyl group having 5 to 25 carbon atoms, and still more preferably an alkyl group having 8 to 20 carbon atoms.

Examples of the substituent include: a hydroxy group; a substituent containing an ether bond, such as an epoxy group or a methoxy group; a substituent containing an ester bond, such as an acetyl group or a propionyl group; or the like.

Examples of the alkyl group optionally having a substituent include pentadecan-1-yl, heptan-1-yl, octan-1-yl, nonan-1-yl, decan-1-yl, undecan-1-yl, dodecan-1-yl, tetradecan-1-yl, or the like.

In the General Formula (CDN1), the unsaturated aliphatic group optionally having a double bond and a substituent represented by $R^2$ is preferably an unsaturated aliphatic group having 3 to 30 carbon atoms, more preferably an unsaturated aliphatic group having 5 to 25 carbon atoms, and still more preferably an unsaturated aliphatic group having 8 to 20 carbon atoms.

The number of the double bond contained in the unsaturated aliphatic group is preferably 1 to 3.

Examples of the substituent include those listed as the substituent of the alkyl group.

Examples of the unsaturated aliphatic group optionally having a double bond and a substituent include pentadeca-8-en-1-yl, pentadeca-8,11-dien-1-yl, pentadeca-8,11,14-trien-1-yl, pentadec-7-en-1-yl, pentadeca-7,10-dien-1-yl, pentadeca-7,10,14-trien-1-yl, or the like.

In the General Formula (CDN1), $R^1$ is preferably pentadeca-8-en-1-yl, pentadeca-8,11-dien-1-yl, pentadeca-8,11,14-trien-1-yl, pentadec-7-en-1-yl, pentadeca-7,10-dien-1-yl, and pentadeca-7,10,14-trien-1-yl.

In the General Formula (CDN1), preferred examples of the alkyl group optionally having a substituent and the unsaturated aliphatic group optionally having a double bond and a substituent, which are represented by $R^2$, include those listed as the alkyl group optionally having a substituent and the unsaturated aliphatic group optionally having a double bond and a substituent, which are represented by $R^1$.

The compound represented by the General Formula (CDN1) may be further modified. For example, the compound may be epoxidized. Specifically, the compound may be a compound having a structure in which the hydroxy group of the compound represented by the General Formula (CDN1) is replaced with the following group (EP), i.e., a compound represented by the following General Formula (CDN1-e).

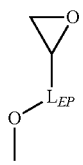

Group (EP)

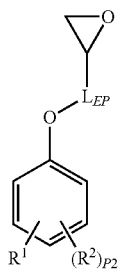

General Formula (CDN1)

In the group (EP) and the General Formula (CDN1-e), $L_{EP}$ represents a single bond or a divalent linking group. In the General Formula (CDN1-e), $R^1$, $R^2$ and P2 each independently have the same meanings as $R^1$, $R^2$ and P2 in the General Formula (CDN1).

In the group (EP) and the General Formula (CDN1-e), examples of the divalent linking group represented by $L_{EP}$ include an alkylene group optionally having a substituent (preferably an alkylene group having 1 to 4 carbon atoms, and more preferably an alkylene group having 1 carbon atom), —$CH_2CH_2OCH_2CH_2$—, or the like.

Examples of the substituent include those listed as the substituent for $R^1$ of the General Formula (CDN1).

$L_{EP}$ is preferably a methylene group.

The polymer obtained by polymerizing a compound represented by the General Formula (CDN1) refers to a polymer obtained by polymerizing at least two compounds represented by the General Formula (CDN1) with or without a linking group.

Examples of the polymer obtained by polymerizing the compound represented by the General Formula (CDN1) include a compound represented by the following General Formula (CDN2).

General Formula (CDN2)

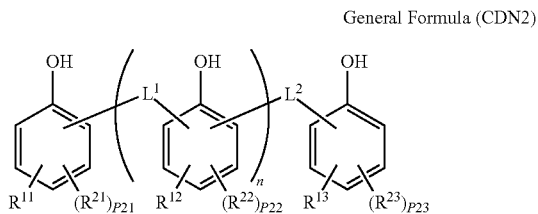

In the General Formula (CDN2), $R^{11}$, $R^{12}$ and $R^{13}$ each independently represent an alkyl group optionally having a substituent, or an unsaturated aliphatic group optionally having a double bond and a substituent. $R^{21}$, $R^{22}$ and $R^{23}$ each independently represent a hydroxy group, a carboxy group, an alkyl group optionally having a substituent, or an unsaturated aliphatic group optionally having a double bond and a substituent. P21 and P23 each independently represent an integer of 0 to 3, and P22 represents an integer of 0 to 2. $L^1$ and $L^2$ each independently represent a divalent linking group. n represents an integer of 0 to 10. A plurality of $R^{21}$ when P21 is 2 or more, a plurality of $R^{22}$ when P22 is 2 or more, and a plurality of $R^{23}$ when P23 is 2 or more may be the same group or different groups, separately. A plurality of $R^{12}$, $R^{22}$, and $L^1$ when n is 2 or more may be the same group or different groups separately, and a plurality of P22 when n is 2 or more may be the same group or different group.

In the General Formula (CDN2), preferred examples of the alkyl group optionally having a substituent, and the unsaturated aliphatic group optionally having a double bond and a substituent, which are represented by $R^{11}$, $R^{12}$, $R^{13}$, $R^{21}$, $R^{22}$ and $R^{23}$ include those listed for $R^1$ of the General Formula (CDN1).

In the General Formula (CDN2), examples of the divalent linking group represented by $L^1$ and $L^2$ include an alkylene group optionally having a substituent (preferably an alkylene group having 2 to 30 carbon atoms, and more preferably an alkylene group having 5 to 20 carbon atoms), or the like.

Examples of the substituent include those listed as the substituent for $R^1$ of the General Formula (CDN1).

In the General Formula (CDN2), n is preferably 1 to 10, and more preferably 1 to 5.

The compound represented by the General Formula (CDN2) may be further modified. For example, the compound may be epoxidized. Specifically, the compound may be a compound having a structure in which the hydroxy group of the compound represented by the General Formula (CDN2) is replaced with the group (EP), i.e., a compound represented by the following General Formula (CDN2-e).

General Formula (CDN2-e)

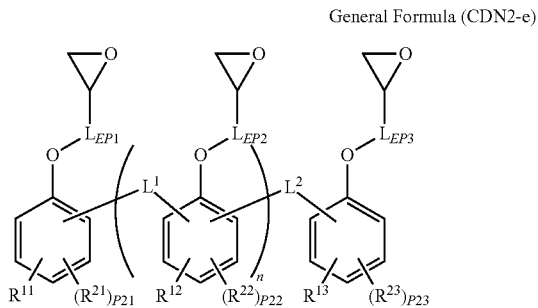

In the General Formula (CDN2-e), $R^{11}$, $R^{12}$, $R^{13}$, $R^{21}$, $R^{22}$, $R^{23}$, P21, P22, P23, $L^1$, and $L^2$ each have the same meaning as $R^{11}$, $R^{12}$, $R^{13}$, $R^{21}$, $R^{22}$, $R^{23}$, P21, P22, P23, P23, $L^1$, $L^2$ and n in the general formula (CDN2).

In the General Formula (CDN2-e), $L_{EP1}$, $L_{EP2}$ and $L_{EP3}$ each independently represent a single bond or a divalent linking group. When n is 2 or more, a plurality of $L_{EP2}$ may be the same group or different groups.

In the General Formula (CDN2-e), preferred examples of the divalent linking group represented by $L_{EP1}$, $L_{EP2}$ and $L_{EP3}$ include those listed for the divalent linking group represented by $L_{EP}$ in the General Formula (CDN1-e).

The polymer obtained by polymerizing a compound represented by the General Formula (CDN1) may be, for example, a polymer obtained by three-dimensionally crosslinking and polymerizing at least three compounds represented by the General Formula (CDN1) with or without a linking group. Examples of the polymer obtained by three-dimensionally crosslinking and polymerizing the compound represented by the General Formula (CDN1) include a compound represented by the following structural formula.

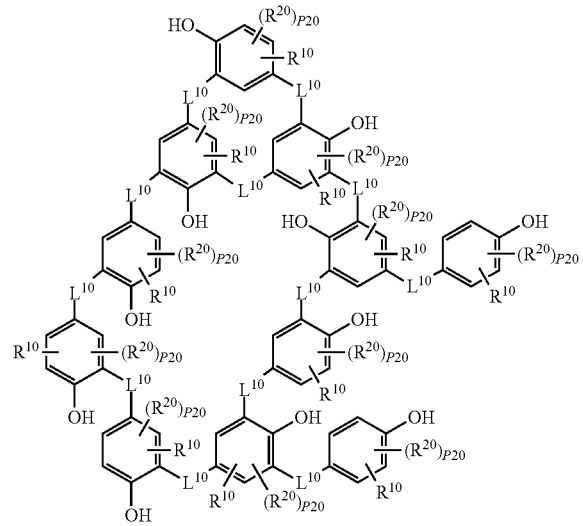

In the above structural formula, $R^{10}$, $R^{20}$ and P20 each independently have the same meanings as $R^1$, $R^2$ and P2 in the General Formula (CDN1). $L^{10}$ represents a single bond or a divalent linking group. A plurality of $R^{10}$, $R^{20}$ and $L^{10}$ may be the same group or different groups, separately. A plurality of P20 may be the same number or different numbers.

In the above structural formula, examples of the divalent linking group represented by $L^{10}$ include an alkylene group optionally having a substituent (preferably an alkylene group having 2 to 30 carbon atoms, and more preferably an alkylene group having 5 to 20 carbon atoms), or the like.

Examples of the substituent include those listed as the substituent for $R^1$ of the General Formula (CDN1).

The compound represented by the above structural formula may be further modified. For example, the compound may be epoxidized. Specifically, the compound may be a compound having a structure in which the hydroxy group of the compound represented by the above structural formula is replaced by the group (EP), for example, a polymer represented by the following structural formula, i.e., a polymer obtained by three-dimensionally crosslinking and polymerizing the compound represented by the General Formula (CDN1-e).

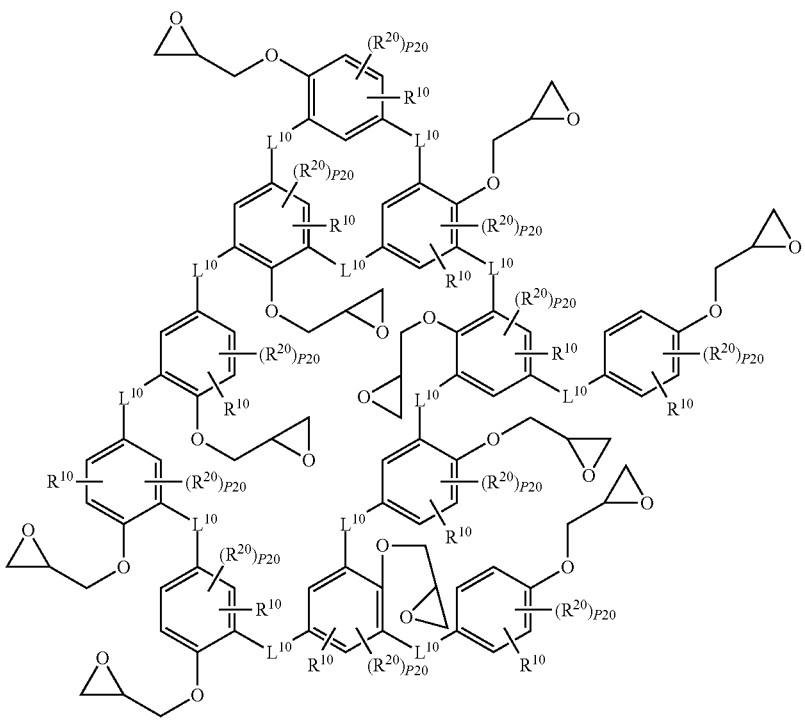

In the above structural formula, $R^{10}$, $R^{20}$ and P20 each independently have the same meanings as $R^1$, $R^2$ and P2 in the General Formula (CDN1-e). $L^{10}$ represents a single bond or a divalent linking group. A plurality of $R^{10}$, $R^{20}$ and $L^{10}$ may be the same group or different groups, separately. A plurality of P20 may be the same number or different numbers.

In the above structural formula, examples of the divalent linking group represented by $L^{10}$ include an alkylene group optionally having a substituent (preferably an alkylene group having 2 to 30 carbon atoms, and more preferably an alkylene group having 5 to 20 carbon atoms), or the like.

Examples of the substituent include those listed as the substituent for $R^1$ of the General Formula (CDN1).

The cardanol compound preferably contains a cardanol compound having an epoxy group, and is more preferably a cardanol compound having an epoxy group, from the viewpoint of improving the rigidity of the resin molded article.

A commercially available product may be used as the cardanol compound. Examples of the commercially available product include: NX-2024, Ultra LITE 2023, NX-2026, GX-2503, NC-510, LITE 2020, NX-9001, NX-9004, NX-9007, NX-9008, NX-9201, and NX-9203, manufactured by Cardolite Corporation; LB-7000, LB-7250, and CD-5L manufactured by Tohoku Chemical Industry Co., Ltd.; or the like. Examples of the commercially available product of the cardanol compound having an epoxy group include NC-513, NC-514S, NC-547, LITE 513E, and Ultra LTE 513 manufactured by Cardolite Corporation.

The cardanol compound preferably has a hydroxyl value of 100 mgKOH/g or more, more preferably 120 mgKOH/g or more, and still more preferably 150 mgKOH/g or more, from the viewpoint of obtaining the rigidity of the resin molded article. The hydroxyl value of the cardanol compound is measured according to Method A of ISO14900.

When a cardanol compound having an epoxy group is used as the cardanol compound, an epoxy equivalent is preferably 300 to 500, more preferably 350 to 480, and still more preferably 400 to 470, from the viewpoint of improving the rigidity of the resin molded article. The epoxy equivalent of the cardanol compound having an epoxy group is measured according to ISO3001.

The cardanol compound preferably has a molecular weight of 250 to 1000, more preferably 280 to 900, and still more preferably 300 to 800, from the viewpoint of easily obtaining the effect of improving the toughness by adding the component (B).

—Ester Compound—

The ester compound contained as the plasticizer (C) in the resin composition according to the exemplary embodiment is not particularly limited as long as it is an ester compound other than the compounds represented by the General Formulas (1) to (5).

Examples of the ester compound as the plasticizer (C) include a dicarboxylic diester, a citric acid ester, a polyether ester compound, a glycol benzoate, a compound represented by the following General Formula (6), an epoxidized fatty acid ester, or the like. Examples of the ester include a monoester, a diester, a triester, and a polyester.

General Formula (6)

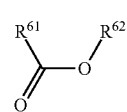

In the General Formula (6), $R^{61}$ represents an aliphatic hydrocarbon group having 7 to 28 carbon atoms, and $R^{62}$ represents an aliphatic hydrocarbon group having 1 to 8 carbon atoms.

The specific form and preferred form of the group represented by $R^{61}$ include the same form as the group represented by $R^{11}$ in the General Formula (1).

The group represented by $R^{62}$ may be a saturated aliphatic hydrocarbon group, or an unsaturated aliphatic hydrocarbon group, and is preferably a saturated aliphatic hydrocarbon group. The group represented by $R^{62}$ may be a linear aliphatic hydrocarbon group, a branched aliphatic hydrocarbon group, or an aliphatic hydrocarbon group containing an alicyclic ring, and is preferably a branched aliphatic hydrocarbon group. The group represented by $R^{62}$ may be a group in which a hydrogen atom in the aliphatic hydrocarbon group is substituted with a halogen atom (e.g., a fluorine atom, a bromine atom and an iodine atom), an oxygen atom, a nitrogen atom or the like, and is preferably unsubstituted. The group represented by $R^{62}$ preferably has 2 or more carbon atoms, more preferably 3 or more carbon atoms, and still more preferably 4 or more carbon atoms.

Specific examples of the ester compound contained as the plasticizer (C) include adipates, citrates, sebacates, azelates, phthalates, acetates, dibasiates, phosphates, condensed phosphates, glycol esters (e.g., glycol benzoate), modified products of fatty acid esters (e.g., epoxidized fatty acid esters), or the like. Examples of the above ester include a monoester, a diester, a triester, and a polyester. Of these, dicarboxylic diesters (e.g., adipic acid diester, sebacic acid diester, azelaic acid diester, and phthalic acid diester) are preferred.

The ester compound contained as the plasticizer (C) in the resin composition according to the exemplary embodiment preferably has a molecular weight (or a weight average molecular weight) of 200 to 2000, more preferably 250 to 1500, and still more preferably 280 to 1000. The weight average molecular weight of the ester compound is not particularly limited, and is a value measured according to the method of measuring the weight average molecular weight of the cellulose acylate (A).

The plasticizer (C) is preferably an adipate ester. The adipate ester has high affinity with the cellulose acylate (A), and disperses in a state close to uniformity to the cellulose acylate (A), thereby further improving thermal fluidity as compared with another plasticizer (C).

Examples of the adipate ester include an adipate diester and an adipate polyester. Specifically, examples include an adipate diester represented by the following General Formula (AE) and an adipate polyester represented by the following General Formula (APE).

group [—($C_xH_{2x}$—O)$_y$—$R^{41}$] (Here, $R^{41}$ represents an alkyl group, x represents an integer of 1 to 10, and y represents an integer of 1 to 10.), and $R^{AE3}$ represents an alkylene group. m1 represents an integer of 1 to 10, and m2 represents an integer of 1 to 20.

In the General Formula (AE) and the General Formula (APE), the alkyl group represented by $R^{AE1}$ and $R^{AE2}$ is preferably an alkyl group having 1 to 12 carbon atoms, more preferably an alkyl group having 4 to 10 carbon atoms, and still more preferably an alkyl group having 8 carbon atoms. The alkyl group represented by $R^{AE1}$ and $R^{AE2}$ may be linear, branched or cyclic, and is preferably linear or branched.

In the polyoxyalkyl group [—($C_xH_{2x}$—O)$_y$—$R^{41}$] represented by $R^{AE1}$ and $R^{AE2}$ in the General Formula (AE) and the General Formula (APE), the alkyl group represented by $R^{41}$ is preferably an alkyl group having 1 to 6 carbon atoms, and more preferably an alkyl group having 1 to 4 carbon atoms. The alkyl group represented by $R^{41}$ may be linear, branched or cyclic, and is preferably linear or branched.

In the general formula (APE), the alkylene group represented by $R^{AE3}$ is preferably an alkylene group having 1 to 6 carbon atoms, and more preferably an alkylene group having 1 to 4 carbon atoms. The alkylene group may be linear, branched or cyclic, and is preferably linear or branched.

In the General Formula (APE), m1 is preferably an integer of 1 to 5, and m2 is preferably an integer of 1 to 10.

In the General Formula (AE) and the General Formula (APE), the group represented by each symbol may be substituted with a substituent. Examples of the substituent include an alkyl group, an aryl group, a hydroxy group, or the like.

The adipate ester preferably has a molecular weight (weight average molecular weight) of 250 to 2000, more preferably 280 to 1500, and still more preferably 300 to 1000. The weight average molecular weight of the adipate ester is a value measured according to the method of measuring the weight average molecular weight of the cellulose acylate (A).

A mixture of an adipate ester and other components may be used as the adipate ester. Examples of the commercially

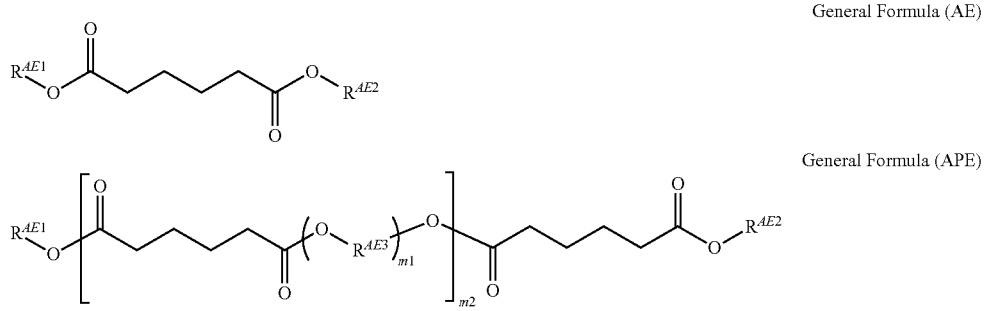

General Formula (AE)

General Formula (APE)

In the General Formula (AE2), $R^{AE1}$ and $R^{AE2}$ each independently represent an alkyl group or a polyoxyalkyl group [—($C_xH_{2x}$—O)$_y$—$R^{41}$] (Here, $R^{41}$ represents an alkyl group, x represents an integer of 1 to 10, and y represents an integer of 1 to 10.).

In the General Formula (APE), $R^{AE1}$ and $R^{AE2}$ each independently represent an alkyl group or a polyoxyalkyl available product of the mixture include Daifatty 101 manufactured by DAIHACHI CHEMICAL INDUSTRY CO., LTD.

The hydrocarbon group at the end of a fatty acid ester such as citric acid ester, sebacic acid ester, azelaic acid ester, phthalic acid ester, and acetic acid ester is preferably an aliphatic hydrocarbon group, preferably an alkyl group having 1 to 12 carbon atoms, more preferably an alkyl group having 4 to 10 carbons, and still more preferably an alkyl group having 8 carbons. The alkyl group may be linear, branched or cyclic, and is preferably linear or branched.

Examples of the fatty acid esters such as citric acid ester, sebacic acid ester, azelaic acid ester, phthalic acid ester, and acetic acid ester include an ester of a fatty acid and an alcohol. Examples of the alcohol include: monohydric alcohols such as methanol, ethanol, propanol, butanol, and 2-ethylhexanol; polyhydric alcohols such as glycerin, a polyglycerol (diglycerin or the like), pentaerythritol, ethylene glycol, diethylene glycol, propylene glycol, butylene glycol, trimethylolpropane, trimethylol ethane, and a sugar alcohol; or the like.

Examples of the glycol in the glycol benzoate include ethylene glycol, diethylene glycol, propylene glycol, or the like.

The epoxidized fatty acid ester is an ester compound having a structure (i.e., oxacyclopropane) in which an unsaturated carbon-carbon bond of an unsaturated fatty acid ester is epoxidized. Examples of the epoxidized fatty acid ester include an ester of a fatty acid and an alcohol in which part or the entire unsaturated carbon-carbon bond in an unsaturated fatty acid (e.g., oleic acid, palmitoleic acid, vaccenic acid, linoleic acid, linolenic acid, and nervonic acid) is epoxidized. Examples of the alcohol include: monohydric alcohols such as methanol, ethanol, propanol, butanol, and 2-ethylhexanol; polyhydric alcohols such as glycerin, a polyglycerol (diglycerin or the like), pentaerythritol, ethylene glycol, diethylene glycol, propylene glycol, butylene glycol, trimethylolpropane, trimethylol ethane, and a sugar alcohol; or the like.

Examples of the commercially available product of the epoxidized fatty acid ester include ADK Cizer D-32, D-55, O-130P, and O-180A (manufactured by ADEKA), and Sanso Cizer E-PS, nE-PS, E-PO, E-4030, E-6000, E-2000H, and E-9000H (manufactured by New Japan Chemical Co., Ltd.).

The polyether ester compound may be either a polyester unit or a polyether unit, each of which is aromatic or aliphatic (including alicyclic). The mass ratio of the polyester unit to the polyether unit is, for example, 20:80 to 80:20. The polyether ester compound preferably has a molecular weight (weight average molecular weight) of 250 to 2000, more preferably 280 to 1500, and still more preferably 300 to 1000. Examples of the commercially available product of the polyether ester compound include ADK Cizer RS-1000 (ADEKA).

Examples of the polyether compound having at least one unsaturated bonds in the molecule include a polyether compound having an allyl group at the end, and a polyalkylene glycol allyl ether is preferred. The polyether compound having at least one unsaturated bonds in the molecule has a molecular weight (weight average molecular weight) of 250 to 2000, more preferably 280 to 1500, and still more preferably 300 to 1000. Examples of the commercially available product of the polyether compound having at least one unsaturated bonds in the molecule include polyalkylene glycol allyl ethers such as UNIOX PKA-5006, UNIOX PKA-5008, UNIOL PKA-5014, and UNIOL PKA-5017 (NOF CORPORATION).

[Other Additives]

<<Thermoplastic Elastomer (D): Component (D)>>

The resin composition according to the exemplary embodiment may further contain a thermoplastic elastomer (D).

The thermoplastic elastomer (D) is at least one thermoplastic elastomer selected from the group consisting of a core-shell structure polymer (d1), which includes a core layer containing a butadiene polymer, and a shell layer containing a polymer selected from a styrene polymer and an acrylonitrile-styrene polymer on the surface of the core layer;

a core-shell structure polymer (d2), which includes a core layer and a shell layer containing an alkyl (meth)acrylate polymer on the surface of the core layer;

an olefin polymer (d3), which is a polymer of an α-olefin and an alkyl (meth)acrylate and contains 60 mass % or more of a structural unit derived from the α-olefin;

a styrene-ethylene-butadiene-styrene copolymer (d4);

a polyurethane (d5); and a polyester (d6).

The thermoplastic elastomer (D) is, for example, a thermoplastic elastomer having elasticity at ordinary temperature (25° C.) and softening at a high temperature like a thermoplastic resin.

(Core-shell Structure Polymer (d1): Component (d1))

The core-shell structure polymer (d1) is a polymer having a core-shell structure with a core layer and a shell layer on the surface of the core layer.

The core-shell structure polymer (d1) is a polymer having a core layer as the innermost layer and a shell layer as the outermost layer (specifically, a shell layer polymer obtained by grafting and polymerizing a styrene polymer or an acrylonitrile-styrene polymer to a core layer containing a butadiene polymer).

One or more other layers (for example, one to six other layers) may be provided between the core layer and the shell layer. When another layer is provided, the core-shell structure polymer (d1) is a multi-layer polymer obtained by grafting and polymerizing a plurality of polymers to a core layer polymer.

The core layer containing a butadiene polymer is not particularly limited as long as it contains a polymer obtained by polymerizing a component containing butadiene, and may be a core layer containing a homopolymer of butadiene, or a core layer containing a copolymer of butadiene and another monomer. When the core layer contains a copolymer of butadiene and another monomer, examples of another monomer include vinyl aromatic monomers. Of the vinyl aromatic monomers, styrene components (for example, styrene, an alkyl-substituted styrene (e.g., α-methylstyrene, 2-methylstyrene, 3-methylstyrene, 4-methylstyrene, 2-ethyl styrene, 3-ethylstyrene, and 4-ethylstyrene), and a halogen-substituted styrene (e.g., 2-chlorostyrene, 3-chlorostyrene, and 4-chlorostyrene)) are preferred. The styrene component may be used alone, or may be used in combination of two or more thereof. Of these styrene components, styrene is preferably used. In addition, polyfunctional monomers such as an allyl (meth)acrylate, a triallyl isocyanurate, and divinylbenzene may be used as another monomer.

Specifically, the core layer containing a butadiene polymer may be, for example, a homopolymer of butadiene, a copolymer of butadiene and styrene, or a terpolymer of butadiene, styrene and divinylbenzene.

The butadiene polymer contained in the core layer contains 60 mass % to 100 mass % (preferably, 70 mass % to 100 mass %) of a structural unit derived from butadiene and 0 mass % to 40 mass % (preferably, 0 mass % to 30 mass %) of a structural unit derived from another monomer (preferably, a styrene component). For example, the percentage of the structural unit derived from each monomer constituting the butadiene polymer is 60 mass % to 100 mass % for butadiene and 0 mass % to 40 mass % for styrene, as each monomer. The percentage is preferably 0 mass % to 5 mass % for divinylbenzene based on the total amount of styrene and divinylbenzene.

The shell layer containing a styrene polymer is not particularly limited as long as it is a shell layer containing a polymer obtained by polymerizing a styrene component, and may be a shell layer containing a homopolymer of styrene, or a shell layer containing a copolymer of styrene and another monomer. Examples of the styrene component include the styrene component as exemplified for the core layer. Examples of other monomer include alkyl (meth)acrylates (for example, methyl (meth)acrylate, ethyl (meth)acrylate, n-propyl (meth)acrylate, n-butyl (meth)acrylate, t-butyl (meth)acrylate, n-hexyl (meth)acrylate, 2-ethylhexyl (meth)acrylate, cyclohexyl (meth)acrylate, and octadecyl (meth)acrylate), or the like. In the alkyl (meth)acrylate, at least a part of the hydrogen of the alkyl chain may be substituted. Examples of the substituent include an amino group, a hydroxyl group, a halogen group, or the like. The alkyl (meth)acrylate may be used alone, or may be used in combination of two or more thereof. In addition, polyfunctional monomers such as an allyl (meth)acrylate, a triallyl isocyanurate, and divinylbenzene may be used as another monomer. The styrene polymer contained in the shell layer is preferably a copolymer of a styrene component in an amount of 85 mass % to 100 mass % and another monomer component (preferably, an alkyl (meth)acrylate) in an amount of 0 mass % to 15 mass %.

Of these, the styrene polymer contained in the shell layer is preferably a copolymer of styrene and an alkyl (meth)acrylate. From the same viewpoint, a copolymer of styrene and an alkyl (meth)acrylate having an alkyl chain with 1 to 8 carbon atoms is preferred, and an alkyl (meth)acrylate polymer having an alkyl chain with 1 to 4 carbon atoms is more preferred.

The shell layer containing an acrylonitrile-styrene polymer is a shell layer containing a copolymer of an acrylonitrile component and a styrene component. The acrylonitrile-styrene polymer is not particularly limited and examples thereof include a known acrylonitrile-styrene polymer. Examples of the acrylonitrile-styrene polymer include a copolymer of an acrylonitrile component in an amount of 10 mass % to 80 mass % and a styrene component in an amount of 20 mass % to 90 mass %. Examples of the styrene component copolymerizing with the acrylonitrile component include the styrene component as exemplified for the core layer. Polyfunctional monomers such as an allyl (meth)acrylate, a triallyl isocyanurate, divinylbenzene or the like may be used as the acrylonitrile-styrene polymer contained in the shell layer.

One or more other layers between the core layer and the shell layer are exemplified by the polymer layer described in the shell layer.

The mass percentage of the shell layer to the entire core-shell structure is preferably 1 mass % to 40 mass %, more preferably 3 mass % to 30 mass %, and still more preferably 5 mass % to 15 mass %.

Of the component (d1), examples of the commercially available product of the core-shell structure polymer (d1) including a core layer containing a butadiene polymer and a shell layer containing a styrene polymer on the surface of core layer include "METABLEN" (registered trademark) manufactured by Mitsubishi Chemical Corporation, "Kane Ace" (Registered trademark) manufactured by Kaneka Corporation, "Clearstrength" (registered trademark) manufactured by Arkema S. A., and "PARALOID" (Registered trademark) manufactured by the Dow Chemical Japan.

In addition, of the component (d1), examples of the commercially available product of the core-shell structure polymer (d1) including a core layer containing a butadiene polymer and a shell layer containing an acrylonitrile-styrene polymer on the surface of core layer include "Blendex" (registered trademark) manufactured by Galata Chemicals, "ELIX" manufactured by ELIX POLYMERS, or the like.

(Core-Shell Structure Polymer (d2): Component (d2))

The core-shell structure polymer (d2) is a polymer having a core-shell structure with a core layer and a shell layer on the surface of the core layer.

The core-shell structure polymer (d2) is a polymer having a core layer as the innermost layer and a shell layer as the outermost layer (specifically, a shell layer polymer obtained by grafting and polymerizing an alkyl (meth)acrylate polymer to a core layer polymer).

One or more other layers (for example, one to six other layers) may be provided between the core layer and the shell layer. When another layer is provided, the core-shell structure polymer (d2) is a multi-layer polymer obtained by grafting and polymerizing a plurality of polymers to a core layer polymer.

The core layer is not particularly limited, and is preferably a rubber layer. Examples of the rubber layer include a layer of a (meth)acrylic rubber, a silicone rubber, a styrene rubber, a conjugated diene rubber, an α-olefin rubber, a nitrile rubber, a urethane rubber, a polyester rubber, a polyamide rubber, and a copolymer rubber of two or more of the above rubbers.

Of these, the rubber layer is preferably a layer of a (meth)acrylic rubber, a silicone rubber, a styrene rubber, a conjugated diene rubber, an α-olefin rubber, and a copolymer rubber of two or more of the above rubbers.

The rubber layer may be obtained by copolymerizing and crosslinking agents (divinylbenzene, allyl acrylate, butylene glycol diacrylate or the like).

Examples of the (meth)acrylic rubber include a polymer rubber obtained by polymerizing a (meth)acrylic component (for example, alkyl esters of (meth)acrylic acid having 2 to 8 carbon atoms).

Examples of the silicone rubber include a rubber containing a silicone component (polydimethylsiloxane, polyphenylsiloxane, or the like).

Examples of the styrene rubber include a polymer rubber obtained by polymerizing a styrene component (styrene, α-methylstyrene, or the like).

Examples of the conjugated diene rubber include a polymer rubber obtained by polymerizing a conjugated diene component (butadiene, isoprene, or the like).

Examples of the α-olefin rubber include a polymer rubber obtained by polymerizing an α-olefin component (ethylene, propylene, and 2-methylpropylene).

Examples of the copolymer rubber include a copolymer rubber obtained by polymerizing two or more kinds of (meth)acrylic components, a copolymer rubber obtained by polymerizing two or more kinds of (meth)acrylic components, a copolymer of a (meth)acrylic component, a conjugated diene component and a styrene component, or the like.

Examples of the alkyl (meth)acrylate in the polymer constituting the shell layer include methyl (meth)acrylate, ethyl (meth)acrylate, n-propyl (meth)acrylate, n-butyl (meth)acrylate, t-butyl (meth)acrylate, n-hexyl (meth)acrylate, 2-ethylhexyl (meth)acrylate, cyclohexyl (meth)acrylate, octadecyl (meth)acrylate, or the like. In the alkyl (meth)acrylate, at least a part of the hydrogen of the alkyl chain may be substituted. Examples of the substituent include an amino group, a hydroxyl group, a halogen group, or the like.

Of these, the alkyl (meth)acrylate polymer is preferably an alkyl (meth)acrylate polymer having an alkyl chain with 1 to 8 carbon atoms, more preferably an alkyl (meth)acrylate polymer having an alkyl chain with 1 to 2 carbon atoms, and still more preferably an alkyl (meth)acrylate polymer having an alkyl chain with 1 carbon atom.

The polymer constituting the shell layer may be, in addition to the alkyl (meth)acrylate, a polymer obtained by polymerizing at least one selected from a glycidyl group-containing vinyl compound and an unsaturated dicarboxylic anhydride.

Examples of the glycidyl group-containing vinyl compound include glycidyl (meth)acrylate, glycidyl itaconate, diglycidyl itaconate, allyl glycidyl ether, styrene-4-glycidyl ether, 4-glycidyl styrene, or the like.

Examples of the unsaturated dicarboxylic anhydride include maleic anhydride, itaconic anhydride, glutaconic anhydride, citraconic anhydride, aconitic anhydride, or the like. Of these, maleic anhydride is preferred.

One or more other layers between the core layer and the shell layer are exemplified by the polymer layer described in the shell layer.

The mass percentage of the shell layer to the entire core-shell structure is preferably 1 mass % to 40 mass %, more preferably 3 mass % to 30 mass %, and still more preferably 5 mass % to 15 mass %.

The core-shell structure polymer (d2) may be prepared by a known method.

Examples of the known method include an emulsion polymerization method. Specifically, the following method is exemplified as a manufacturing method. First, a mixture of monomers is subjected to emulsion polymerization to prepare core particles (core layer), and thereafter a mixture of other monomers is subjected to emulsion polymerization in the presence of the core particles (core layer) to prepare a core-shell structure polymer forming a shell layer around the core particles (core layer).

In addition, when another layer is formed between the core layer and the shell layer, the emulsion polymerization of the mixture of other monomers is repeated to obtain a desired core-shell structure polymer including a core layer, another layer and a shell layer.

Examples of the commercially available product of the core-shell structure polymer (d2) include "METABLEN" (Registered trademark) manufactured by Mitsubishi Chemical Corporation, "Kane Ace" (Registered trademark) manufactured by Kaneka Corporation, "PARALOID" (Registered trademark) manufactured by the Dow Chemical Japan, "STAPHYLOID" (Registered trademark) manufactured by Aica Kogyo Company, Limited, "Paraface" (Registered trademark) manufactured by KURARAY CO., LTD., or the like.

The average primary particle diameter of the core-shell structure polymer (d1 and d2) is not particularly limited, and is preferably 50 nm to 500 nm, more preferably 50 nm to 400 nm, still more preferably 100 nm to 300 nm, and particularly preferably 150 nm to 250 nm.

The average primary particle diameter refers to a value measured by the following method. Particles are observed with a scanning electron microscope, the maximum diameter of the primary particles is taken as the primary particle diameter, and the primary particle diameter of 100 particles is measured and averaged to obtain the average primary particle diameter. Specifically, the average primary particle diameter is obtained by observing the dispersed form of the core-shell structure polymer in the resin composition with a scanning electron microscope.

(Olefin Polymer (d3): Component (d3))

In the olefin polymer (d3), the olefin polymer is a polymer of an α-olefin and an alkyl (meth)acrylate, and is preferably an olefin polymer containing 60 mass % or more of a structural unit derived from an α-olefin.

Examples of the α-olefin in the olefin polymer include ethylene, propylene, 2-methylpropylene, or the like. An α-olefin having 2 to 8 carbon atoms is preferred, and an α-olefin having 2 to 3 carbon atoms is more preferred. Of these, ethylene is still more preferred.

Examples of the alkyl (meth)acrylate polymerizing with the α-olefin include methyl (meth)acrylate, ethyl (meth)acrylate, n-propyl (meth)acrylate, n-butyl (meth)acrylate, t-butyl (meth)acrylate, n-hexyl (meth)acrylate, 2-ethylhexyl (meth)acrylate, cyclohexyl (meth)acrylate, octadecyl (meth)acrylate, or the like. An alkyl (meth)acrylate having an alkyl chain with 1 to 8 carbon atoms is preferred, an alkyl (meth)acrylate having an alkyl chain with 1 to 4 carbon atoms is more preferred, and an alkyl (meth)acrylate having an alkyl chain with 1 to 2 carbon atoms is still more preferred.

Here, the olefin polymer is preferably a polymer of ethylene and methyl acrylate.

The olefin polymer preferably contains 60 mass % to 97 mass % of and more preferably 70 mass % to 85 mass % of a structural unit derived from the α-olefin.

The olefin polymer may contain the structural unit derived from the α-olefin and another structural unit derived from an alkyl (meth)acrylate. However, another structural unit is preferably 10 mass % or less based on all the structural units in the olefin polymer.

(Styrene-Ethylene-Butadiene-Styrene Copolymer (d4): Component (d4))

The copolymer (d4) is not particularly limited as long as it is a thermoplastic elastomer, and examples thereof include a styrene-ethylene-butadiene-styrene copolymer. The copolymer (d4) may be a styrene-ethylene-butadiene-styrene copolymer and a hydrogenated product thereof.

The copolymer (d4) is preferably a styrene-ethylene-butadiene-styrene copolymer and a hydrogenated product thereof. In addition, from the same viewpoint, the copolymer (d4) is preferably a block copolymer, and, for example, is preferably a copolymer (styrene-ethylene/butylene-styrene triblock copolymer) having a block of the styrene portion at both ends and a block of a central portion containing ethylene/butylene by hydrogenating at least a part of the double bond of the butadiene portion. The ethylene/butylene block portion of the styrene-ethylene/butylene-styrene copolymer may be a random copolymer.

The copolymer (d4) is obtained by a known method. When the copolymer (d4) is a hydrogenated product of the styrene-ethylene-butadiene-styrene copolymer, for example, the copolymer may be obtained by hydrogenating the butadiene portion of a styrene-butadiene-styrene block copolymer in which the conjugated diene portion includes a 1,4 bond.

Examples of the commercially available product of the copolymer (d4) include "Kraton" (registered trademark) manufactured by Kraton Corporation, "Septon" (registered trademark) manufactured by Kuraray CO., LTD., or the like.

(Polyurethane (d5): Component (d5))

The polyurethane (d5) is not particularly limited as long as it is a thermoplastic elastomer, and examples thereof include a known polyurethane. The polyurethane (d5) is preferably a linear polyurethane. The polyurethane (d5) is obtained, for example, by reacting a polyol component (a polyether polyol, a polyester polyol, a polycarbonate polyol, or the like), an organic isocyanate component (an aromatic diisocyanate, an aliphatic (including alicyclic) diisocyanate, or the like), and, if necessary, a chain extender (an aliphatic (including alicyclic) diol, or the like). Each of the polyol component and the organic isocyanate component may be used alone, or may be used in combination of two or more thereof.

The polyurethane (d5) is preferably an aliphatic polyurethane. The aliphatic polyurethane is preferably obtained, for example, by reacting a polyol component containing a polycarbonate polyol with an isocyanate component containing an aliphatic diisocyanate.

The polyurethane (d5) may be obtained by reacting a polyol component with an organic isocyanate component in a manner that a value of the NCO/OH ratio in the raw material in the synthesis of polyurethane is within a range of 0.90 to 1.5. The polyurethane (d5) is obtained by a known method such as a one-shot method, a prepolymerization method or the like.

Examples of the commercially available product of the polyurethane (d5) include "Estane" (registered trademark) manufactured by Lubrizol Corporation, "Elastollan" (registered trademark) manufactured by BASF, or the like. Examples also include "Desmopan" (registered trademark) manufactured by Bayer, or the like.

(Polyester (d6): Component (d6))

The polyester (d6) is not particularly limited as long as it is a thermoplastic elastomer, and examples thereof include a known polyester. The polyester (d6) is preferably an aromatic polyester. In the exemplary embodiment, the aromatic polyester represents a polyester having an aromatic ring in the structure thereof.

Examples of the polyester (d6) include a polyester copolymer (polyether ester, polyester ester, or the like). Specific examples include a polyester copolymer having a hard segment including a polyester unit and a soft segment including a polyester unit; a polyester copolymer having a hard segment including a polyester unit and a soft segment including a polyether unit; and a polyester copolymer having a hard segment including a polyester unit and a soft segment including a polyether unit and a polyester unit. The mass ratio (hard segment/soft segment) of the hard segment and the soft segment in the polyester copolymer is preferably, for example, 20/80 to 80/20. The polyester unit constituting the hard segment and the polyester unit and the polyether unit constituting the soft segment may be either aromatic or aliphatic (including alicyclic).

The polyester copolymer as the polyester (d6) may be obtained by a known method. The polyester copolymer is preferably a linear polyester copolymer. The polyester copolymer is obtained, for example, by esterifying or transesterifying a dicarboxylic acid component having 4 to 20 carbon atoms, a diol component having 2 to 20 carbon atoms and a polyalkylene glycol component having a number average molecular weight of 300 to 20000 (containing an alkylene oxide adduct of polyalkylene glycols) (an esterification or transesterification method) to produce an oligomer, and thereafter polycondensating the oligomer (a polycondensation method). In addition, examples of the esterification or transesterification method include a method using a dicarboxylic acid component having 4 to 20 carbon atoms, a diol component having 2 to 20 carbon atoms, and an aliphatic polyester component having a number average molecular weight of 300 to 20,000. The dicarboxylic acid component is an aromatic or aliphatic dicarboxylic acid or an ester derivative thereof, the diol component is an aromatic or aliphatic diol, and the polyalkylene glycol component is an aromatic or aliphatic polyalkylene glycol.

Of these, it is preferable to use a dicarboxylic acid component having an aromatic ring as the dicarboxylic acid component of the polyester copolymer. It is preferable to use an aliphatic diol component and an aliphatic polyalkylene glycol component as the diol component and the polyalkylene glycol component, respectively.

Examples of the commercially available product of the polyester (d6) include "PELPRENE" (registered trademark) manufactured by Toyobo Co., Ltd. and "Hytrel" (registered trademark) manufactured by DU PONT-TORAY CO., LTD.

<<Ester Compound (E): Component (E)>>

The resin composition according to the exemplary embodiment may further contain a specific ester compound (E).

The specific ester compound (E) is at least one selected from the group consisting of a compound represented by the following General Formula (1), a compound represented by the following General Formula (2), a compound represented by the following General Formula (3), a compound represented by the following General Formula (4), and a compound represented by the following General Formula (5).

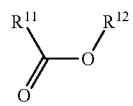

General Formula (1)

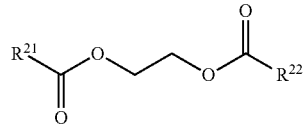

General Formula (2)

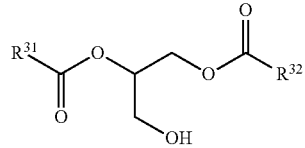

General Formula (3)

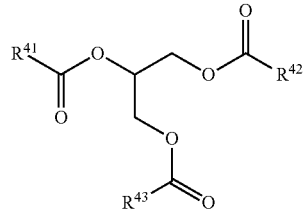

General Formula (4)

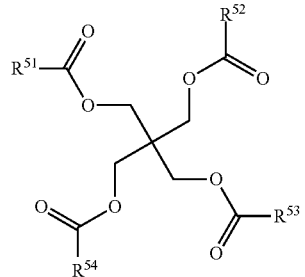

General Formula (5)

In the General Formula (1), $R^{11}$ represents an aliphatic hydrocarbon group having 7 to 28 carbon atoms, and $R^{12}$ represents an aliphatic hydrocarbon group having 9 to 28 carbon atoms.

In the General Formula (2), $R^{21}$ and $R^{22}$ each independently represent an aliphatic hydrocarbon group having 7 to 28 carbon atoms.

In the General Formula (3), $R^{31}$ and $R^{32}$ each independently represent an aliphatic hydrocarbon group having 7 to 28 carbon atoms.

In the General Formula (4), $R^{41}$, $R^{42}$, and $R^{43}$ each independently represent an aliphatic hydrocarbon group having 7 to 28 carbon atoms.

In the General Formula (5), $R^{51}$, $R^{52}$, $R^{53}$, and $R^{54}$ each independently represent an aliphatic hydrocarbon group having 7 to 28 carbon atoms.

$R^{11}$ represents an aliphatic hydrocarbon group having 7 to 28 carbon atoms. The group represented by $R^{11}$ is preferably an aliphatic hydrocarbon group having 9 or more carbon atoms, more preferably an aliphatic hydrocarbon group having 10 or more carbon atoms, and still more preferably an aliphatic hydrocarbon group having 15 or more carbon atoms. The group represented by $R^{11}$ is preferably an aliphatic hydrocarbon group having 24 or less carbon atoms, more preferably an aliphatic hydrocarbon group having 20 or less carbon atoms, and still more preferably an aliphatic hydrocarbon group having 18 or less carbon atoms. The group represented by $R^{11}$ is particularly preferably an aliphatic hydrocarbon group having 17 carbon atoms.

The group represented by $R^{11}$ may be a saturated aliphatic hydrocarbon group or an unsaturated aliphatic hydrocarbon group. The group represented by $R^{11}$ is particularly preferably a saturated aliphatic hydrocarbon group.

The group represented by $R^{11}$ may be a linear aliphatic hydrocarbon group, a branched aliphatic hydrocarbon group, or an aliphatic hydrocarbon group containing an alicyclic ring. The group represented by $R^{11}$ is preferably an aliphatic hydrocarbon group not containing an alicyclic ring (i.e., a chain aliphatic hydrocarbon group), and more preferably a linear aliphatic hydrocarbon group.

When the group represented by $R^{11}$ is an unsaturated aliphatic hydrocarbon group, the number of unsaturated bonds in the group is preferably 1 to 3, more preferably 1 or 2, and still more preferably 1.

When the group represented by $R^{11}$ is an unsaturated aliphatic hydrocarbon group, the group preferably contains a linear saturated hydrocarbon chain having 5 to 24 carbon atoms, more preferably a linear saturated hydrocarbon chain having 7 to 22 carbon atoms, still more preferably a linear saturated hydrocarbon chain having 9 to 20 carbon atoms, and particularly preferably a linear saturated hydrocarbon chain having 15 to 18 carbon atoms.

When the group represented by $R^{11}$ is a branched aliphatic hydrocarbon group, the number of branched chains in the group is preferably 1 to 3, more preferably 1 or 2, and still more preferably 1.

When the group represented by $R^{11}$ is a branched aliphatic hydrocarbon group, the main chain of the group preferably has 5 to 24 carbon atoms, more preferably 7 to 22 carbon atoms, still more preferably 9 to 20 carbon atoms, and particularly preferably 15 to 18 carbon atoms.

When the group represented by $R^{11}$ is an aliphatic hydrocarbon group containing an alicyclic ring, the number of alicyclic rings in the group is preferably 1 or 2, and more preferably 1.

When the group represented by $R^{11}$ is an aliphatic hydrocarbon group containing an alicyclic ring, the alicyclic ring in the group is preferably an alicyclic ring having 3 or 4 carbon atoms, and more preferably an alicyclic ring having 3 carbon atoms.

The group represented by $R^{11}$ is preferably a linear saturated aliphatic hydrocarbon group, a linear unsaturated aliphatic hydrocarbon group, a branched saturated aliphatic hydrocarbon group, or a branched unsaturated aliphatic hydrocarbon group, and particularly preferably a linear saturated aliphatic hydrocarbon group, from the viewpoint of further improving the rigidity of the resin molded article. The preferred number of carbon atoms in these aliphatic hydrocarbon groups is as described above.

The group represented by $R^{11}$ may be a group in which a hydrogen atom in the aliphatic hydrocarbon group is substituted with a halogen atom (e.g., a fluorine atom, a bromine atom and an iodine atom), an oxygen atom, a nitrogen atom or the like, and is preferably unsubstituted.

R12 represents an aliphatic hydrocarbon group having 9 to 28 carbon atoms. Examples of the group represented by $R^{12}$ include the same forms as those described for $R^{11}$. However, the number of carbon atoms of the group represented by $R^{12}$ is preferably or less.

The group represented by $R^{12}$ is preferably an aliphatic hydrocarbon group having 10 or more carbon atoms, more preferably an aliphatic hydrocarbon group having 11 or more carbon atoms, and still more preferably an aliphatic hydrocarbon group having 16 or more carbon atoms. The group represented by $R^{12}$ is preferably an aliphatic hydrocarbon group having 24 or less carbon atoms, more preferably an aliphatic hydrocarbon group having 20 or less carbon atoms, and still more preferably an aliphatic hydrocarbon group having 18 or less carbon atoms. The group represented by $R^{12}$ is particularly preferably an aliphatic hydrocarbon group having 18 carbon atoms.

The group represented by $R^{12}$ is preferably a linear saturated aliphatic hydrocarbon group, a linear unsaturated aliphatic hydrocarbon group, a branched saturated aliphatic hydrocarbon group, or a branched unsaturated aliphatic hydrocarbon group, and particularly preferably a linear saturated aliphatic hydrocarbon group, from the viewpoint of further improving the rigidity of the resin molded article. The preferred number of carbon atoms in these aliphatic hydrocarbon groups is as described above.

The specific forms and preferred forms of the groups represented by $R^{21}$, $R^{22}$, $R^{31}$, $R^{32}$, $R^{41}$, $R^{42}$, $R^{43}$, $R^{51}$, $R^{52}$, $R^{53}$ and $R^{54}$ are the same as those described for $R^{11}$.

Hereinafter, specific examples of the aliphatic hydrocarbon group having 7 to 28 carbon atoms represented by $R^{11}$, $R^{21}$, $R^{22}$, $R^{31}$, $R^{32}$, $R^{41}$, $R^{42}$, $R^{43}$, $R^{51}$, $R^{52}$, $R^{53}$ and $R^{54}$ and specific examples of the aliphatic hydrocarbon group having 9 to 28 carbon atoms represented by $R^{12}$ are shown, but the exemplary embodiment is not limited thereto.

| $R^{11}$, $R^{12}$, $R^{21}$, $R^{22}$, $R^{31}$, $R^{32}$, $R^{41}$, $R^{42}$, $R^{43}$, $R^{51}$, $R^{52}$, $R^{53}$, $R^{54}$ Linear and saturated | | |
|---|---|---|
| —$C_6H_{12}CH_3$ | —$C_{12}H_{24}CH_3$ | —$C_{19}H_{38}CH_3$ |
| —$C_7H_{14}CH_3$ | —$C_{14}H_{28}CH_3$ | —$C_{20}H_{40}CH_3$ |
| —$C_8H_{16}CH_3$ | —$C_{15}H_{30}CH_3$ | —$C_{21}H_{42}CH_3$ |
| —$C_9H_{18}CH_3$ | —$C_{16}H_{32}CH_3$ | —$C_{23}H_{46}CH_3$ |
| —$C_{10}H_{20}CH_3$ | —$C_{17}H_{34}CH_3$ | —$C_{25}H_{50}CH_3$ |
| —$C_{11}H_{22}CH_3$ | —$C_{18}H_{36}CH_3$ | —$C_{27}H_{54}CH_3$ |

| $R^{11}, R^{12}, R^{21}, R^{22}, R^{31}, R^{32}, R^{41}, R^{42}, R^{43}, R^{51}, R^{52}, R^{53}, R^{54}$ Linear and unsaturated | |
|---|---|
| —CH=CH—C$_4$H$_8$CH$_3$ | —C$_2$H$_4$—CH=CH—C$_2$H$_4$CH$_3$ |
| —CH=CH—C$_6$H$_{12}$CH$_3$ | —C$_4$H$_8$—CH=CH—C$_4$H$_8$CH$_3$ |
| —CH=CH—C$_8$H$_{16}$CH$_3$ | —C$_5$H$_{10}$—CH=CH—C$_5$H$_{10}$CH$_3$ |
| —CH=CH—C$_{14}$H$_{28}$CH$_3$ | —C$_6$H$_{12}$—CH=CH—C$_6$H$_{12}$CH$_3$ |
| —CH=CH—C$_{15}$H$_{30}$CH$_3$ | —C$_7$H$_{14}$—CH=CH—C$_3$H$_6$CH$_3$ |
| —CH=CH—C$_{16}$H$_{32}$CH$_3$ | —C$_7$H$_{14}$—CH=CH—C$_5$H$_{10}$CH$_3$ |
| —CH=CH—C$_{17}$H$_{34}$CH$_3$ | —C$_7$H$_{14}$—CH=CH—C$_7$H$_{14}$CH$_3$ |
| —CH=CH—C$_{18}$H$_{36}$CH$_3$ | —C$_7$H$_{14}$—CH=CH—C$_8$H$_{16}$CH$_3$ |
| —CH=CH—C$_{20}$H$_{40}$CH$_3$ | —C$_7$H$_{14}$—CH=CH—C$_9$H$_{18}$CH$_3$ |
| —CH=CH—C$_{25}$H$_{50}$CH$_3$ | —C$_8$H$_{16}$—CH=CH—C$_8$H$_{16}$CH$_3$ |
| —C$_5$H$_{10}$—CH=CH$_2$ | —C$_9$H$_{18}$—CH=CH—C$_5$H$_{10}$CH$_3$ |
| —C$_7$H$_{14}$—CH=CH$_2$ | —C$_9$H$_{18}$—CH=CH—C$_7$H$_{14}$CH$_3$ |
| —C$_{15}$H$_{30}$—CH=CH$_2$ | —C$_{10}$H$_{20}$—CH=CH—C$_{12}$H$_{24}$CH$_3$ |
| —C$_{16}$H$_{32}$—CH=CH$_2$ | —C$_{10}$H$_{20}$—CH=CH—C$_{15}$H$_{30}$CH$_3$ |
| —C$_{17}$H$_{34}$—CH=CH$_2$ | —C$_{11}$H$_{22}$—CH=CH—C$_7$H$_{14}$CH$_3$ |
| —C$_{18}$H$_{36}$—CH=CH$_2$ | —C$_{12}$H$_{24}$—CH=CH—C$_{12}$H$_{24}$CH$_3$ |
| —C$_{21}$H$_{42}$—CH=CH$_2$ | —C$_{13}$H$_{26}$—CH=CH—C$_7$H$_{14}$CH$_3$ |
| —C$_{26}$H$_{52}$—CH=CH$_2$ | —CH$_2$—CH=CH—C$_7$H$_{14}$—CH=CH—C$_7$H$_{14}$CH$_3$ |
| —CH$_2$—CH=CH—C$_3$H$_6$CH$_3$ | —C$_7$H$_{14}$—CH=CH—CH$_2$—CH=CH—C$_4$H$_8$CH$_3$ |
| —CH$_2$—CH=CH—C$_7$H$_{14}$CH$_3$ | —C$_7$H$_{14}$—CH=CH—C$_7$H$_{14}$—CH=CH—C$_7$H$_{14}$CH$_3$ |
| —CH$_2$—CH=CH—C$_{10}$H$_{20}$CH$_3$ | —C$_7$H$_{14}$—CH=CH—C$_9$H$_{18}$—CH=CH—C$_7$H$_{14}$CH$_3$ |
| —CH$_2$—CH=CH—C$_{16}$H$_{32}$CH$_3$ | —C$_7$H$_{14}$—CH=CH—CH$_2$—CH=CH—CH$_2$—CH=CH—CH$_2$CH$_3$ |
| —CH$_2$—CH=CH—C$_{24}$H$_{48}$CH$_3$ | —CH=CH—C$_7$H$_{14}$—CH=CH—C$_7$H$_{14}$—CH=CH—C$_7$H$_{14}$CH$_3$ |

| $R^{11}, R^{12}, R^{21}, R^{22}, R^{31}, R^{32}, R^{41}, R^{42}, R^{43}, R^{51}, R^{52}, R^{53}, R^{54}$ Branched and saturated | |
|---|---|
| —C$_5$H$_{10}$—CH(CH$_3$)$_2$ | —CH(C$_2$H$_5$)—C$_7$H$_{14}$CH$_3$ |
| —C$_{10}$H$_{20}$—CH(CH$_3$)$_2$ | —CH(C$_2$H$_5$)—C$_{14}$H$_{28}$CH$_3$ |
| —C$_{14}$H$_{28}$—CH(CH$_3$)$_2$ | —CH(C$_2$H$_5$)—C$_{16}$H$_{32}$CH$_3$ |
| —C$_{15}$H$_{30}$—CH(CH$_3$)$_2$ | —CH(C$_2$H$_5$)—C$_{18}$H$_{36}$CH$_3$ |
| —C$_{16}$H$_{32}$—CH(CH$_3$)$_2$ | —CH(C$_4$H$_9$)—C$_{15}$H$_{30}$CH$_3$ |
| —C$_{17}$H$_{34}$—CH(CH$_3$)$_2$ | —CH(C$_6$H$_{13}$)—C$_{12}$H$_{24}$CH$_3$ |
| —C$_{20}$H$_{40}$—CH(CH$_3$)$_2$ | —CH(C$_6$H$_{13}$)—C$_{14}$H$_{28}$CH$_3$ |
| —C$_{25}$H$_{50}$—CH(CH$_3$)$_2$ | —CH(C$_6$H$_{13}$)—C$_{16}$H$_{32}$CH$_3$ |
| —C$_6$H$_{12}$—C(CH$_3$)$_3$ | —CH$_2$—CH(CH$_3$)—C$_3$H$_6$CH$_3$ |
| —C$_{10}$H$_{20}$—C(CH$_3$)$_3$ | —CH$_2$—CH(CH$_3$)—C$_6$H$_{12}$CH$_3$ |
| —C$_{14}$H$_{28}$—C(CH$_3$)$_3$ | —CH$_2$—CH(CH$_3$)—C$_8$H$_{16}$CH$_3$ |
| —C$_{15}$H$_{30}$—C(CH$_3$)$_3$ | —CH$_2$—CH(CH$_3$)—C$_{12}$H$_{24}$CH$_3$ |
| —C$_{16}$H$_{32}$—C(CH$_3$)$_3$ | —CH$_2$—CH(CH$_3$)—C$_{16}$H$_{32}$CH$_3$ |
| —CH(CH$_3$)—C$_5$H$_{10}$CH$_3$ | —CH$_2$—CH(CH$_3$)—C$_{20}$H$_{40}$CH$_3$ |
| —CH(CH$_3$)—C$_{10}$H$_{20}$CH$_3$ | —CH$_2$—CH(CH$_3$)—C$_{24}$H$_{48}$CH$_3$ |
| —CH(CH$_3$)—C$_{13}$H$_{26}$CH$_3$ | —CH$_2$—CH(C$_6$H$_{13}$)$_2$ |
| —CH(CH$_3$)—C$_{14}$H$_{28}$CH$_3$ | —CH$_2$—CH(C$_6$H$_{13}$)—C$_7$H$_{14}$CH$_3$ |
| —CH(CH$_3$)—C$_{15}$H$_{30}$CH$_3$ | —CH$_2$—CH(C$_6$H$_{13}$)—C$_9$H$_{18}$CH$_3$ |
| —CH(CH$_3$)—C$_{16}$H$_{32}$CH$_3$ | —CH$_2$—CH(C$_6$H$_{13}$)—C$_{12}$H$_{24}$CH$_3$ |
| —CH(CH$_3$)—C$_{17}$H$_{34}$CH$_3$ | —CH$_2$—CH(C$_6$H$_{13}$)—C$_{15}$H$_{30}$CH$_3$ |
| —CH(CH$_3$)—C$_{18}$H$_{36}$CH$_3$ | —CH$_2$—CH(C$_8$H$_{17}$)—C$_{19}$H$_{38}$CH$_3$ |
| —CH(CH$_3$)—C$_{22}$H$_{44}$CH$_3$ | —CH$_2$—CH(C$_8$H$_{17}$)—C$_9$H$_{18}$CH$_3$ |
| —CH(CH$_3$)—C$_{25}$H$_{50}$CH$_3$ | —CH$_2$—CH(C$_{10}$H$_{21}$)—C$_{12}$H$_{24}$CH$_3$ |
| —C$_2$H$_4$—CH(CH$_3$)—C$_3$H$_6$—CH(CH$_3$)—C$_3$H$_6$—CH(CH$_3$)—C$_3$H$_6$—CH(CH$_3$)$_2$ | |

| $R^{11}, R^{12}, R^{21}, R^{22}, R^{31}, R^{32}, R^{41}, R^{42}, R^{43}, R^{51}, R^{52}, R^{53}, R^{54}$ Branched and unsaturated | |
|---|---|
| —CH=CH—C$_5$H$_{10}$—CH(CH$_3$)$_2$ | —CH$_2$—CH=CH—CH(CH$_3$)—CH$_2$CH$_3$ |
| —CH=CH—C$_{12}$H$_{24}$—CH(CH$_3$)$_2$ | —CH$_2$—CH=CH—CH(CH$_3$)—C$_3$H$_6$CH$_3$ |
| —CH=CH—C$_{15}$H$_{30}$—CH(CH$_3$)$_2$ | —CH$_2$—CH=CH—CH(CH$_3$)—C$_7$H$_{14}$CH$_3$ |
| —CH=CH—C$_{16}$H$_{32}$—CH(CH$_3$)$_2$ | —CH$_2$—CH=CH—CH(CH$_3$)—C$_{16}$H$_{32}$CH$_3$ |
| —CH=CH—C$_{18}$H$_{36}$—CH(CH$_3$)$_2$ | —CH$_2$—CH=CH—CH(CH$_3$)—C$_{22}$H$_{44}$CH$_3$ |
| —CH=CH—C$_{23}$H$_{46}$—CH(CH$_3$)$_2$ | —CH$_2$—CH=CH—CH(CH$_3$)—CH$_2$CH$_3$ |
| —CH=CH—C$_7$H$_{14}$—C(CH$_3$)$_3$ | —CH$_2$—CH=CH—C$_2$H$_4$—CH(CH$_3$)—C$_2$H$_4$CH$_3$ |
| —CH=CH—C$_{12}$H$_{24}$—C(CH$_3$)$_3$ | —CH$_2$—CH=CH—C$_2$H$_4$—CH(CH$_3$)—C$_4$H$_8$CH$_3$ |
| —CH=CH—C$_{14}$H$_{28}$—C(CH$_3$)$_3$ | —CH$_2$—CH=CH—C$_6$H$_{12}$—CH(CH$_3$)—C$_6$H$_{12}$CH$_3$ |
| —CH=H—C$_{16}$H$_{32}$—C(CH$_3$)$_3$ | —CH$_2$—CH=CH—C$_7$H$_{14}$—CH(CH$_3$)—C$_7$H$_{14}$CH$_3$ |
| —CH=H—C$_{20}$H$_{40}$—C(CH$_3$)$_3$ | —CH$_2$—CH=CH—C$_7$H$_{14}$—CH(CH$_3$)—C$_8$H$_{16}$CH$_3$ |
| —CH=CH—CH(C$_8$H$_{17}$)$_2$ | —CH$_2$—CH=CH—CH$_2$—CH=CH—CH(CH$_3$)—C$_3$H$_6$CH$_3$ |

-continued

| $R^{11}, R^{12}, R^{21}, R^{22}, R^{31}, R^{32}, R^{41}, R^{42}, R^{43}, R^{51}, R^{52}, R^{53}, R^{54}$ | |
|---|---|
| Branched and unsaturated | |
| —CH=CH—CH($C_6H_{13}$)—$C_7H_{14}CH_3$ | —$CH_2$—CH=CH—$CH_2$—CH=CH—CH($CH_3$)—$C_7H_{14}CH_3$ |
| —CH=CH—CH($C_6H_{13}$)—$C_{11}H_{22}CH_3$ | —$CH_2$—CH=CH—$CH_2$—CH=CH—CH($CH_3$)—$C_{16}H_{32}CH_3$ |
| —CH=CH—CH($C_8H_{17}$)—$C_9H_{18}CH_3$ | —$CH_2$—CH=CH—CH($CH_3$)—CH=CH—$CH_2$—$C_3H_6CH_3$ |
| —CH=CH—CH($C_8H_{17}$)—$C_{12}H_{24}CH_3$ | —$CH_2$—CH=CH—CH($CH_3$)—CH=CH—$CH_2$—$C_7H_{14}CH_3$ |
| —$C_3H_6$—CH=CH—$C_5H_{10}$—CH($CH_3$)$_2$ | —$CH_2$—CH=CH—CH($C_2H_5$)—CH=CH—$CH_2$—$C_7H_{14}CH_3$ |
| —$C_7H_{14}$—CH=CH—$C_6H_{12}$—CH($CH_3$)$_2$ | —$CH_2$—CH=CH—CH($CH_3$)—CH=CH—$CH_2$—$C_{16}H_{32}CH_3$ |
| —$C_7H_{14}$—CH=CH—$C_7H_{14}$—CH($CH_3$)$_2$ | —$CH_2$—CH=CH—CH($C_2H_5$)—CH=CH—$CH_2$—$C_{16}H_{32}CH_3$ |
| —$C_8H_{16}$—CH=CH—$C_6H_{12}$—CH($CH_3$)$_2$ | —$CH_2$—CH=CH—CH($CH_3$)—CH=CH—$CH_2$—$C_{19}H_{38}CH_3$ |
| —$C_8H_{16}$—CH=CH—$C_7H_{14}$—CH($CH_3$)$_2$ | —$CH_2$—CH=CH—CH($CH_3$)—CH=CH—CH($CH_3$)—$CH_2CH_3$ |
| —CH($CH_3$)—$C_{14}H_{28}$—CH=$CH_2$ | —$CH_2$—CH=CH—CH($CH_3$)—CH=CH—CH($CH_3$)—$C_3H_6CH_3$ |
| —CH($CH_3$)—$C_{16}H_{32}$—CH=$CH_2$ | —$CH_2$—CH=CH—CH($CH_3$)—CH=CH—CH($CH_3$)—$C_7H_{14}CH_3$ |
| —CH($C_2H_5$)—$C_{14}H_{28}$—CH=$CH_2$ | —$CH_2$—CH=CH—CH($C_2H_5$)—CH=CH—CH($C_2H_5$)—$C_7H_{14}CH_3$ |
| —CH($C_2H_5$)—$C_{16}H_{32}$—CH=$CH_2$ | —$CH_2$—CH=CH—CH($CH_3$)—CH=CH—CH($CH_3$)—$C_{12}H_{24}CH_3$ |
| —CH($C_4H_9$)—$C_{14}H_{28}$—CH=$CH_2$ | —$CH_2$—CH=CH—CH($CH_3$)—CH=CH—CH($CH_3$)—$C_{15}H_{30}CH_3$ |
| —CH($C_6H_{13}$)—$C_{10}H_{20}$—CH=$CH_2$ | —$CH_2$—CH=CH—CH($CH_3$)—CH=CH—CH($CH_3$)—$C_{18}H_{36}CH_3$ |
| —CH($C_6H_{13}$)—$C_{12}H_{24}$—CH=$CH_2$ | —$C_4H_8$—CH=CH—$C_4H_8$—CH=CH—$C_4H_8$—CH($CH_3$)$_2$ |
| —$CH_2$—CH($C_6H_{13}$)—$C_7H_{14}$—CH=$CH_2$ | —$C_7H_{14}$—CH=CH—$C_7H_{14}$—CH=CH—$C_7H_{14}$—CH($CH_3$)$_2$ |

The ester compound (E) may be used alone, or may be used in combination of two or more thereof.

<<At Least One Compound (F) Selected from Group Consisting of Hindered Phenol Compound, Tocopherol Compound, Tocotrienol Compound, Phosphite Compound and Hydroxylamine Compound: Component (F)>>

The resin composition according to the exemplary embodiment may further contain a compound (F).

The compound (F) is at least one selected from the group consisting of a hindered phenol compound, a tocopherol compound, a tocotrienol compound, a phosphite compound and a hydroxylamine compound.

—Hindered Phenol Compound—

The hindered phenol compound in the exemplary embodiment refers to a compound in which at least one of ortho positions of the hydroxy group of the phenol is substituted with an alkyl group. The alkyl group is preferably a bulky alkyl group such as a tert-butyl group or tert-pentyl(1,1-dimethylpropyl).

Examples of the hindered phenol compound include a compound represented by the following General Formula (HP1).

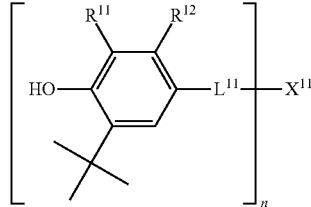

General Formula (HP1)

In the General Formula (HP1), $R^{11}$ and $R^{12}$ each independently represent a hydrogen atom or an alkyl group having 1 to 6 carbon atoms, $L^{11}$ represents a single bond or a divalent linking group, $X^{11}$ represents a single bond or an n-valent group, and n represents 1, 2, 3 or 4.

The alkyl group having 1 to 6 carbon atoms represented by $R^{11}$ is preferably an alkyl group having 1 to 5 carbon atoms, and more preferably an alkyl group having 1 to 4 carbon atoms. The alkyl group having 1 to 6 carbon atoms represented by $R^{11}$ may be linear, branched or cyclic, and is preferably a linear or branched alkyl group.

The alkyl group having 1 to 6 carbon atoms represented by $R^{11}$ is specifically and preferably a methyl group, an ethyl group, an n-propyl group, an isopropyl group, an n-butyl group, a sec-butyl group, an isobutyl group, a tert-butyl group, an n-pentyl group, an isopentyl group, a neopentyl group, a tert-pentyl group, an n-hexyl group, and a 1,1-dimethylbutyl group, more preferably a methyl group, a tert-butyl group or a tert-pentyl group, and still more preferably a tert-butyl group.

The alkyl group having 1 to 6 carbon atoms represented by $R^u$ is preferably an alkyl group having 1 to 3 carbon atoms, and more preferably an alkyl group having 1 or 2 carbon atoms. The alkyl group having 1 to 6 carbon atoms represented by $R^u$ may be linear, branched or cyclic, and is preferably a linear or branched alkyl group.

The alkyl group having 1 to 6 carbon atoms represented by $R^{12}$ is specifically and preferably a methyl group, an ethyl group, an n-propyl group, an isopropyl group, an n-butyl group, a sec-butyl group, an isobutyl group, a tert-butyl group, an n-pentyl group, an isopentyl group, a neopentyl group, a tert-pentyl group, an n-hexyl group, and a 1,1-dimethylbutyl group, more preferably a methyl group, an ethyl group, an n-propyl group or an isopropyl group, and still more preferably a methyl group or an ethyl group.

The group represented by $R^{11}$ is preferably a hydrogen atom, a methyl group, a tert-butyl group or a tert-pentyl group.

The group represented by $R^{12}$ is preferably a hydrogen atom, a methyl group or an ethyl group.

$R^{11}$ and $R^{12}$ may be bonded to each other to form a ring.

Examples of the divalent linking group represented by $L^{11}$ include an alkylene group having 1 to 6 carbon atoms (preferably, an alkylene group having 1 to 4 carbon atoms), —R—C(=O)O—R—, or the like. Here, R and R each independently represent an alkylene group having 1 to 6 carbon atoms (preferably, an alkylene group having 1 to 4 carbon atoms, and more preferably an alkylene group having 1 or 2 carbon atoms) or a phenylene group.

—R—C(=O)O—R— is preferably —$CH_2CH_2$—C(=O)O—$CH_2$—.

Examples of a monovalent group represented by $X^{11}$ include an aliphatic hydrocarbon group.

The aliphatic hydrocarbon group may be linear, branched, or may contain an alicyclic ring. The aliphatic hydrocarbon group is preferably an aliphatic hydrocarbon group not containing an alicyclic ring (i.e., a chain aliphatic hydrocarbon group), and more preferably a linear aliphatic hydrocarbon group, from the viewpoint of easily dispersing the compound represented by the General Formula (HP1) in the bio-resin (A).

The aliphatic hydrocarbon group may be a saturated aliphatic hydrocarbon group or an unsaturated aliphatic hydrocarbon group. The aliphatic hydrocarbon group is preferably a saturated aliphatic hydrocarbon group, from the viewpoint of easily dispersing the compound represented by the General Formula (HP1) in the bio-resin (A).

The aliphatic hydrocarbon group preferably has 1 to 24 carbon atoms, more preferably 6 to 20 carbon atoms, and still more preferably 12 to 18 carbon atoms, from the viewpoint of easily dispersing the compound represented by the General Formula (HP1) in the bio-resin (A).

Specific examples of the aliphatic hydrocarbon group include the same groups as those described for $Y^{41}$ in the General Formula (P1) to be described later.

Specific examples of the aliphatic hydrocarbon group are preferably a linear alkyl group having 6 to 20 carbon atoms, more preferably a linear alkyl group having 12 to 18 carbon, and still more preferably a linear alkyl group having 16 to 18 carbon atoms.

Examples of a divalent group represented by $X^{11}$ include a group (an alkanediyl group) obtained by removing two hydrogen atoms from an alkane having from 1 to 6 carbon atoms (preferably, an alkane having 1 to 4 carbon atoms), —(R—O—R)$_m$—, or the like. Here, R and R each independently represent an alkylene group or a phenylene group having 1 to 4 carbon atoms, and m represents 1, 2, 3 or 4 (preferably 1 or 2).

—(R—O—R)$_m$— is preferably —CH$_2$—O—CH$_2$— and —(CH$_2$—O—CH$_2$)$_2$—.

Examples of the divalent group represented by $X^{11}$ also include the following group (HP1-a). * represents a binding position with $L^{11}$.

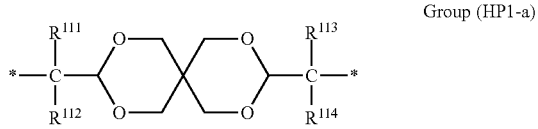

Group (HP1-a)

In the Formula (HP1-a), and $R^{111}$, $R^{112}$, $R^{113}$, and $R^{114}$ each independently represent a hydrogen atom or an alkyl group having 1 to 4 carbon atoms. The alkyl group having 1 to 4 carbon atoms is preferably a methyl group, an ethyl group, an n-propyl group, an isopropyl group, an n-butyl group, a sec-butyl group, an isobutyl group, and a tert-butyl group, more preferably a methyl group or an ethyl group, and still more preferably a methyl group.

Examples of a trivalent group represented by $X^{11}$ include a group (an alkanetriyl group) obtained by removing three hydrogen atoms from an alkane having from 1 to 6 carbon atoms (preferably, an alkane having 1 to 4 carbon atoms), or the like.

Examples of the trivalent group represented by $X^{11}$ also include the following groups (HP1-b) and (HP1-c). * represents a binding position with $L^{11}$.

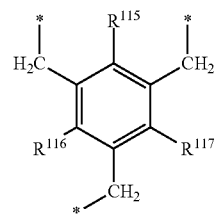

Group (HP1-b)

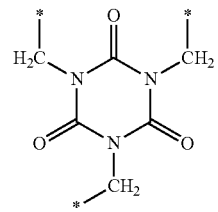

Group (HP1-c)

In the Formula (HP1-b), $R^{115}$, $R^{116}$, and $R^{117}$ each independently represent a hydrogen atom or an alkyl group having 1 to 4 carbon atoms. The alkyl group having 1 to 4 carbon atoms is preferably a methyl group, an ethyl group, an n-propyl group, an isopropyl group, an n-butyl group, a sec-butyl group, an isobutyl group, and a tert-butyl group, more preferably a methyl group or an ethyl group, and still more preferably a methyl group.

Examples of a tetravalent group represented by $X^{11}$ include a group (an alkane tetrayl group) obtained by removing four hydrogen atoms from an alkane having from 1 to 6 carbon atoms (preferably, an alkane having 1 to 4 carbon atoms), or the like. Of these, methanetetrayl is preferred.

When n is 2, 3 or 4, a plurality of $R^{11}$, $R^{12}$ and $L^{11}$ may be the same group or different groups, separately.

Specific examples of the compound represented by the General Formula (HP1) include "Irganox 1010", "Irganox 245", and "Irganox 1076" manufactured by BASF; "ADK STAB AO-80", "ADK STAB AO-60", "ADK STAB AO-50", "ADK STAB AO-40", "ADK STAB AO-30", "ADK STAB AO-20", and "ADK STAB AO-330" manufactured by ADEKA Corporation; and "Sumilizer GA-80" manufactured by Sumitomo chemical Co., Ltd.

Examples of the hindered phenol compound include a compound represented by the following General Formula (HP2).

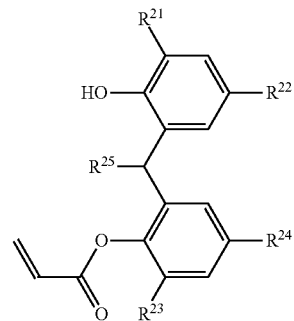

General Formula (HP2)

In the General Formula (HP2), $R^{21}$, $R^{22}$, $R^{23}$, $R^{24}$, and $R^{25}$ each independently represent a hydrogen atom or an alkyl group having 1 to 6 carbon atoms.

The alkyl group having 1 to 6 carbon atoms represented by $R^{21}$ is preferably an alkyl group having 4 to 6 carbon atoms, and more preferably an alkyl group having 4 or 5 carbon atoms. The alkyl group having 1 to 6 carbon atoms represented by $R^{21}$ may be linear, branched or cyclic, and is preferably a linear or branched alkyl group, and more preferably a branched alkyl group.

The alkyl group having 1 to 6 carbon atoms represented by $R^{21}$ is specifically and preferably a methyl group, an ethyl group, an n-propyl group, an isopropyl group, an n-butyl group, a sec-butyl group, an isobutyl group, a tert-butyl group, an n-pentyl group, an isopentyl group, a neopentyl group, a tert-pentyl group, an n-hexyl group, and a 1,1-dimethylbutyl group, more preferably a tert-butyl group, a tert-pentyl group or a 1,1-dimethylbutyl group, and still more preferably a tert-butyl group or a tert-pentyl group.

The alkyl group having 1 to 6 carbon atoms represented by $R^{22}$ is preferably an alkyl group having 1 to 5 carbon atoms, and more preferably an alkyl group having 1 to 4 carbon atoms. The alkyl group having 1 to 6 carbon atoms represented by $R^{22}$ may be linear, branched or cyclic, and is preferably a linear or branched alkyl group.

The alkyl group having 1 to 6 carbon atoms represented by $R^{22}$ is specifically and preferably a methyl group, an ethyl group, an n-propyl group, an isopropyl group, an n-butyl group, a sec-butyl group, an isobutyl group, a tert-butyl group, an n-pentyl group, an isopentyl group, a neopentyl group, a tert-pentyl group, an n-hexyl group, and a 1,1-dimethylbutyl group, and more preferably a methyl group, a tert-butyl group or a tert-pentyl group.

The specific form and preferred form of the group represented by $R^{23}$ are the same as those described for $R^{21}$.

The specific form and preferred form of the group represented by $R^{24}$ are the same as those described for $R^{22}$.

The alkyl group having 1 to 6 carbon atoms represented by $R^{25}$ is preferably an alkyl group having 1 to 3 carbon atoms, and more preferably an alkyl group having 1 or 2 carbon atoms. The alkyl group having 1 to 6 carbon atoms represented by $R^{25}$ may be linear, branched or cyclic, and is preferably a linear or branched alkyl group.

The alkyl group having 1 to 6 carbon atoms represented by $R^{25}$ is specifically and preferably a methyl group, an ethyl group, an n-propyl group, an isopropyl group, an n-butyl group, a sec-butyl group, an isobutyl group, a tert-butyl group, an n-pentyl group, an isopentyl group, a neopentyl group, a tert-pentyl group, an n-hexyl group, and a 1,1-dimethylbutyl group, more preferably a methyl group, an ethyl group, an n-propyl group or an isopropyl group, and still more preferably a methyl group or an ethyl group.

The group represented by $R^{21}$ is preferably a tert-butyl group or a tert-pentyl group.

The group represented by $R^{22}$ is preferably a hydrogen atom, a methyl group, a tert-butyl group or a tert-pentyl group.

The group represented by $R^{23}$ is preferably a tert-butyl group or a tert-pentyl group.

The group represented by $R^{24}$ is preferably a hydrogen atom, a methyl group, a tert-butyl group or a tert-pentyl group.

The group represented by $R^{25}$ is preferably a hydrogen atom, a methyl group or an ethyl group.

Specific examples of the compound represented by the General Formula (HP2) include "Sumilizer GM" and "Sumilizer GS" manufactured by Sumitomo chemical Co., Ltd.

—Tocopherol Compound and Tocotrienol Compound—

Examples of the tocopherol compound or the tocotrienol compound include a compound represented by the following General Formula (T1).

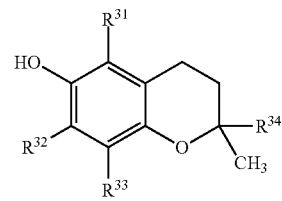

General Formula (T1)

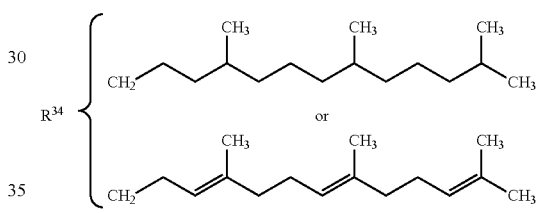

In the General Formula (T-1), $R^{31}$, $R^{32}$, and $R^{33}$ each independently represent a hydrogen atom or an alkyl group having 1 to 3 carbon atoms.

The alkyl group having 1 to 3 carbon atoms represented by $R^{31}$ may be linear, branched or cyclic, and is preferably a linear or branched alkyl group.

The alkyl group having 1 to 3 carbon atoms represented by $R^{31}$ is specifically and preferably a methyl group, an ethyl group, an n-propyl group, and an isopropyl group, more preferably a methyl group or an ethyl group, and still more preferably a methyl group.

The group represented by $R^{31}$ is particularly preferably a hydrogen atom, or a methyl group.

The specific form and preferred form of the group represented by $R^{32}$ are the same as those described for $R^{31}$.

The specific form and preferred form of the group represented by $R^{33}$ are the same as those described for $R^{31}$.

Specific examples of the tocopherol compound include the following compounds.

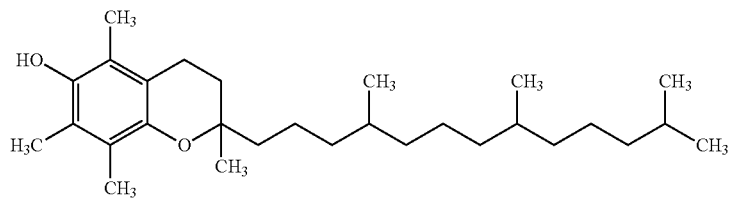

-continued
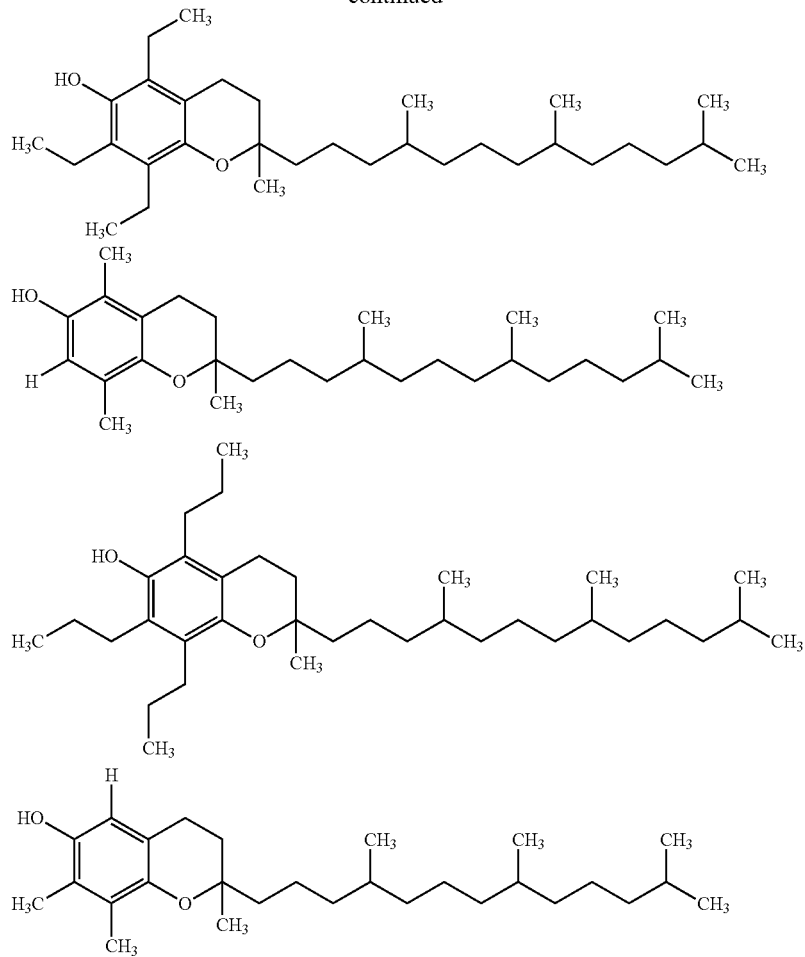
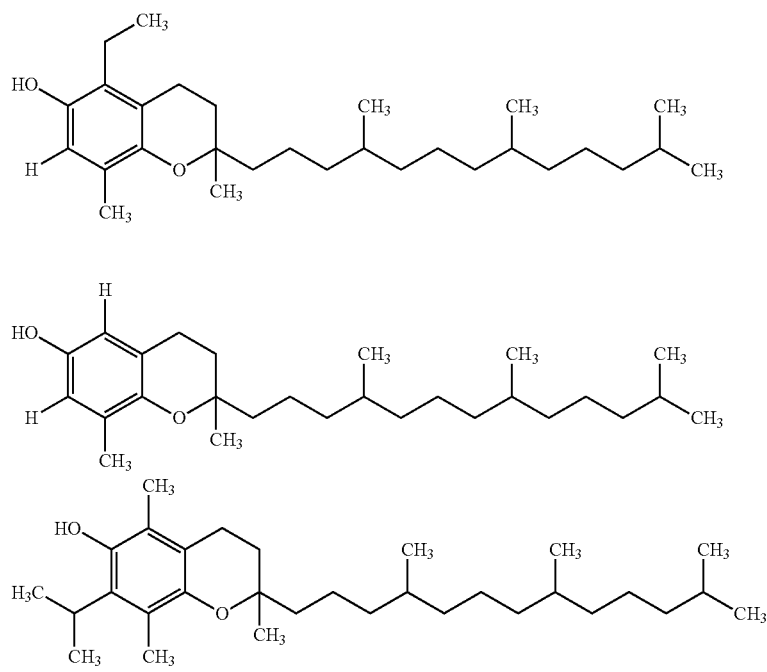

Specific examples of the tocotrienol compound include the following compounds.
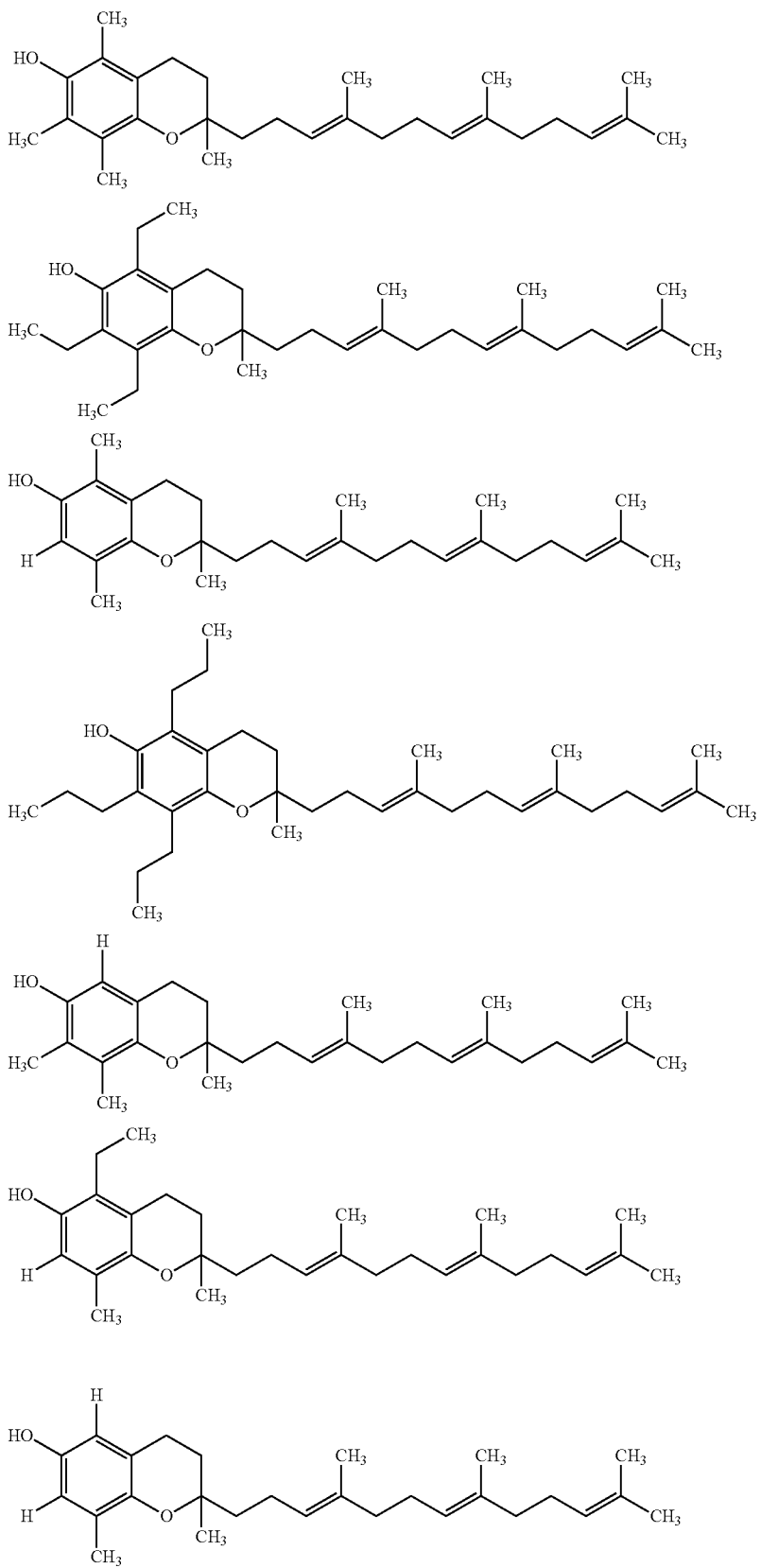

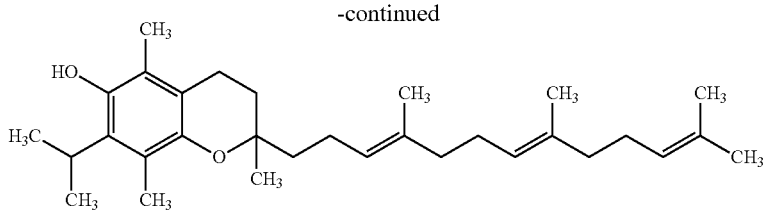

-continued

—Phosphite Compound—
Examples of the phosphite compound include a compound represented by the following General Formula (P1).

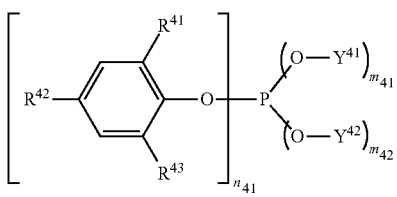

General Formula (P1)

In the General Formula (P1), $R^{41}$, $R^{42}$ and $R^{43}$ each independently represent a hydrogen atom or an alkyl group having 1 to 12 carbon atoms, $Y^{41}$ and $Y^{42}$ each independently represent an aliphatic hydrocarbon group, $n_{41}$ represents 1, 2 or 3, $m_{41}$ represents 0 or 1, and $m_{42}$ represents 0 or 1, wherein $n_{41}+m_{41}+m_{42}=3$.

The alkyl group having 1 to 12 carbon atoms represented by $R^{41}$ is preferably an alkyl group having 1 to 10 carbon atoms, and more preferably an alkyl group having 1 to 9 carbon atoms. The alkyl group having 1 to 12 carbon atoms represented by $R^4$ may be linear, branched or cyclic, and is preferably a linear or branched alkyl group.

Specific examples of the alkyl group having 1 to 12 carbon atoms represented by $R^{41}$ include a methyl group, an ethyl group, an n-propyl group, an isopropyl group, an n-butyl group, a sec-butyl group, an isobutyl group, a tert-butyl group, an n-pentyl group, an isopentyl group, an neopentyl group, a tert-pentyl group, an n-hexyl group, an isohexyl group, a sec-hexyl group, a tert-hexyl group, a heptyl group, an isoheptyl group, a sec-heptyl group, a tert-heptyl group, an n-octyl group, an isooctyl group, a sec-octyl group, a tert-octyl group, an n-nonyl group, an isononyl group, a sec-nonyl group, a tert-nonyl group, an n-decyl group, an isodecyl group, a sec-decyl group, a tert-decyl group, an n-undecyl group, an isoundecyl group, a sec-dodecyl group, a tert-dodecyl group, an n-dodecyl group, an isododecyl group, a sec-dodecyl group, and a tert-dodecyl group.

Examples of the alkyl group having 1 to 12 carbon atoms represented by $R^{42}$ include the same forms as those described for $R^{41}$.

Examples of the alkyl group having 1 to 12 carbon atoms represented by $R^{43}$ include the same forms as those described for $R^{41}$.

The group represented by $R^{41}$ is preferably a hydrogen atom, a methyl group or a tert-butyl group.

The group represented by $R^{42}$ is preferably an alkyl group having 1 to 9 carbon atoms, more preferably a methyl group or a tert-butyl group, and still more preferably a tert-butyl group.

The group represented by $R^{43}$ is preferably a hydrogen atom, a methyl group or a tert-butyl group.

When $n_{41}$ is 2 or 3, a plurality of $R^{41}$, $R^{42}$ and $R^{43}$ may be the same group or different groups, separately.

When $n_{41}$ is 2 or 3, a plurality of $R^{41}$, a plurality of $R^{43}$, or $R^{41}$ and $R^{43}$ may be linked to each other to form a ring.

The aliphatic hydrocarbon group represented by $Y^{41}$ may be linear, branched, or may contain an alicyclic ring. The group represented by $Y^{41}$ is preferably an aliphatic hydrocarbon group not containing an alicyclic ring (i.e., a chain aliphatic hydrocarbon group), and more preferably a linear aliphatic hydrocarbon group, from the viewpoint of easily dispersing the compound represented by the General Formula (P1) in the bio-resin (A).

The aliphatic hydrocarbon group represented by $Y^{41}$ may be a saturated aliphatic hydrocarbon group or an unsaturated aliphatic hydrocarbon group. The aliphatic hydrocarbon group represented by $Y^{41}$ is preferably a saturated aliphatic hydrocarbon group, from the viewpoint of easily dispersing the compound represented by the General Formula (P1) in the bio-resin (A).

The aliphatic hydrocarbon group represented by $Y^{41}$ preferably has 1 to 20 carbon atoms, more preferably 1 to 12 carbon atoms, and still more preferably 2 to 8 carbon atoms, from the viewpoint of easily dispersing the compound represented by the General Formula (P1) in the bio-resin (A).

The specific form and preferred form of the aliphatic hydrocarbon group represented by $Y^{42}$ are the same as those described for $Y^{41}$.

Specific examples of the aliphatic hydrocarbon group represented by $Y^{41}$ and $Y^{42}$ are shown below.

| $Y^{41}$, $Y^{42}$ | | |
|---|---|---|
| Linear and Saturated | Linear and Unsaturated | |
| —$CH_3$ | —CH=CH—$CH_3$ | —$CH_2$—CH=CH—$CH_2CH_3$ |
| —$CH_2CH_3$ | —CH=CH—$C_5H_{10}CH_3$ | —$CH_2$—CH=CH—$C_4H_8CH_3$ |
| —$C_3H_6CH_3$ | —CH=CH—$C_9H_{18}CH_3$ | —$CH_2$—CH=CH—$C_8H_{16}CH_3$ |
| —$C_4H_8CH_3$ | —CH=CH—$C_{13}H_{26}CH_3$ | —$CH_2$—CH=CH—$C_{16}H_{32}CH_3$ |
| —$C_5H_{10}CH_3$ | —CH=CH—$C_{17}H_{34}CH_3$ | —$C_3H_6$—CH=CH—$C_7H_{14}CH_3$ |
| —$C_7H_{14}CH_3$ | —$CH_2$—CH=$CH_2$ | —$C_3H_6$—CH=CH—$C_{14}H_{28}CH_3$ |
| —$C_9H_{18}CH_3$ | —$C_6H_{12}$—CH=$CH_2$ | —$C_2H_4$—CH=CH—$C_2H_4CH_3$ |
| —$C_{11}H_{22}CH_3$ | —$C_{10}H_{20}$—CH=$CH_2$ | —$C_4H_8$—CH=CH—$C_4H_8CH_3$ |
| —$C_{13}H_{26}CH_3$ | —$C_{14}H_{28}$—CH=$CH_2$ | —$C_6H_{12}$—CH=CH—$C_6H_{12}CH_3$ |
| —$C_{15}H_{30}CH_3$ | —$C_{18}H_{36}$—CH=$CH_2$ | —$C_8H_{16}$—CH=CH—$C_8H_{16}CH_3$ |
| —$C_{17}H_{34}CH_3$ | —$CH_2$—CH=CH—$C_3H_6$—CH=CH—$C_3H_6CH_3$ | |
| —$C_{19}H_{38}CH_3$ | —$CH_2$—CH=CH—$C_7H_{14}$—CH=CH—$C_7H_{14}CH_3$ | |

| $Y^{41}, Y^{42}$ | |
|---|---|
| Branched and Saturated | Branched and Unsaturated |
| —CH(CH$_3$)$_2$ | —CH═CH—CH(CH$_3$)$_2$ |
| —C$_4$H$_8$—CH(CH$_3$)$_2$ | —CH═CH—C$_3$H$_6$—CH(CH$_3$)$_2$ |
| —C$_9$H$_{18}$—CH(CH$_3$)$_2$ | —CH═CH—C$_9$H$_{18}$—CH(CH$_3$)$_2$ |
| —C$_{14}$H$_{28}$—CH(CH$_3$)$_2$ | —CH═CH—C$_{15}$H$_{30}$—CH(CH$_3$)$_2$ |
| —C$_{17}$H$_{34}$—CH(CH$_3$)$_2$ | —CH═CH—C(CH$_3$)$_3$ |
| —C(CH$_3$)$_3$ | —CH═CH—C$_3$H$_6$—C(CH$_3$)$_3$ |
| —C$_6$H$_{12}$—C(CH$_3$)$_3$ | —CH═CH—C$_8$H$_{16}$—C(CH$_3$)$_3$ |
| —C$_{11}$H$_{22}$—C(CH$_3$)$_3$ | —CH═CH—C$_{14}$H$_{28}$—C(CH$_3$)$_3$ |
| —C$_{16}$H$_{32}$—C(CH$_3$)$_3$ | —CH═CH—CH(C$_2$H$_5$)$_2$ |
| —CH$_2$—CH(C$_2$H$_5$)$_2$ | —CH═CH—CH(C$_6$H$_{13}$)$_2$ |
| —CH$_2$—CH(C$_6$H$_{13}$)$_2$ | —CH═CH—CH(C$_8$H$_{17}$)$_2$ |
| —CH$_2$—CH(C$_9$H$_{19}$)$_2$ | —C$_2$H$_4$—CH═CH—C$_3$H$_6$—CH(CH$_3$)$_2$ |
| —CH(CH$_3$)—C$_5$H$_{10}$CH$_3$ | —C$_3$H$_6$—CH═CH—C$_5$H$_{10}$—CH(CH$_3$)$_2$ |
| —CH(CH$_3$)—C$_{12}$H$_{24}$CH$_3$ | —C$_7$H$_{14}$—CH═CH—C$_7$H$_{14}$—CH(CH$_3$)$_2$ |
| —CH(CH$_3$)—C$_{16}$H$_{32}$CH$_3$ | —CH(CH$_3$)—C$_5$H$_{10}$—CH═CH$_2$ |
| —CH(C$_2$H$_5$)—C$_3$H$_6$CH$_3$ | —CH(CH$_3$)—C$_{16}$H$_{32}$—CH═CH$_2$ |
| —CH(C$_2$H$_5$)—C$_{16}$H$_{32}$CH$_3$ | —C$_4$H$_8$—CH═CH—C$_4$H$_8$—CH═CH—C$_4$H$_8$—CH(CH$_3$)$_2$ | n4i represents 1, 2 or 3, preferably 2 or 3, and more preferably 3.

In the General Formula (P1), specific examples of the compound when $n_{41}=2$ include "Irgafos 38" (bis(2,4-di-t-butyl-6-methylphenyl)-ethyl-phosphite) manufactured by BASF.

In the General Formula (P1), the compound represented by the General Formula (P1) when $n_{41}=3$ include a compound represented by the following General Formula (P1-a).

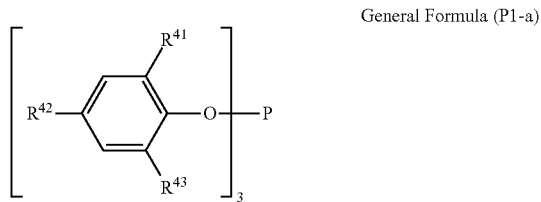

General Formula (P1-a)

$R^{41}$, $R^{42}$ and $R^{43}$ in the General Formula (P1-a) have the same meaning as $R^{41}$, $R^{42}$ and $R^{43}$ in the General Formula (P1).

Specific examples of the compound represented by the General Formula (P1-a) include "Irgafos 168" and "Irgafos TNPP" manufactured by BASF.

Examples of the phosphite compound include a compound represented by the following General Formula (P2).

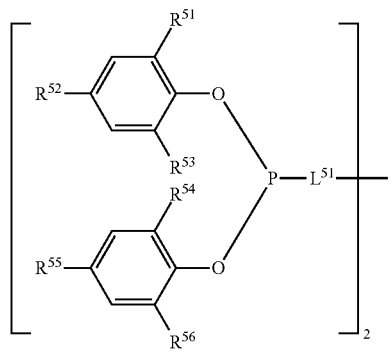

General Formula (P2)

In the General Formula (P2), $R^{51}$, $R^{52}$, $R^{53}$, $R^{54}$, $R^{55}$, and $R^{56}$ each independently represent a hydrogen atom or an alkyl group having 1 to 12 carbon atoms, and $L^{51}$ represents a single bond or a divalent linking group.

The alkyl group having 1 to 12 carbon atoms represented by $R^{51}$ is preferably an alkyl group having 1 to 10 carbon atoms, and more preferably an alkyl group having 1 to 9 carbon atoms. The alkyl group having 1 to 12 carbon atoms represented by $R^{51}$ may be linear, branched or cyclic, and is preferably a linear or branched alkyl group.

Specific examples of the alkyl group having 1 to 12 carbon atoms represented by $R^{51}$ include a methyl group, an ethyl group, an n-propyl group, an isopropyl group, an n-butyl group, a sec-butyl group, an isobutyl group, a tert-butyl group, an n-pentyl group, an isopentyl group, a neopentyl group, a tert-pentyl group, an n-hexyl group, an isohexyl group, a sec-hexyl group, a tert-hexyl group, a heptyl group, an isoheptyl group, a sec-heptyl group, a tert-heptyl group, an n-octyl group, an isooctyl group, a sec-octyl group, a tert-octyl group, an n-nonyl group, an isononyl group, a sec-nonyl group, a tert-nonyl group, an n-decyl group, an isodecyl group, a sec-decyl group, a tert-decyl group, an n-undecyl group, an isoundecyl group, a sec-dodecyl group, a tert-dodecyl group, an n-dodecyl group, an isododecyl group, a sec-dodecyl group, and a tert-dodecyl group.

Examples of the alkyl group having 1 to 12 carbon atoms represented by $R^{52}$ include the same forms as those described for $R^{51}$.

Examples of the alkyl group having 1 to 12 carbon atoms represented by $R^{53}$ include the same forms as those described for $R^{51}$.

Examples of the alkyl group having 1 to 12 carbon atoms represented by $R^{54}$ include the same forms as those described for $R^{51}$.

Examples of the alkyl group having 1 to 12 carbon atoms represented by $R^{55}$ include the same forms as those described for $R^{51}$.

Examples of the alkyl group having 1 to 12 carbon atoms represented by $R^{56}$ include the same forms as those described for $R^{51}$.

The group represented by $R^{51}$ is preferably a hydrogen atom, a methyl group or a tert-butyl group.

The group represented by $R^{52}$ is preferably an alkyl group having 1 to 9 carbon atoms, more preferably a methyl group or a tert-butyl group, and still more preferably a tert-butyl group.

The group represented by $R^{53}$ is preferably a hydrogen atom, a methyl group or a tert-butyl group.

The group represented by $R^{54}$ is preferably a hydrogen atom, a methyl group or a tert-butyl group.

The group represented by $R^{55}$ is preferably an alkyl group having 1 to 9 carbon atoms, more preferably a methyl group or a tert-butyl group, and still more preferably a tert-butyl group.

The group represented by $R^{56}$ is preferably a hydrogen atom, a methyl group or a tert-butyl group.

Examples of the divalent linking group represented by $L^{51}$ include an alkylene group or an arylene group, preferably an alkylene group or a phenylene group having 1 to 6 carbon atoms, and more preferably an alkylene group or a phenylene group having 1 to 4 carbon atoms.

Specific examples of the compound represented by the General Formula (P2) include "Irgafos P-EPQ" manufactured by BASF.

Examples of the phosphite compound include a compound represented by the following General Formula (P3).

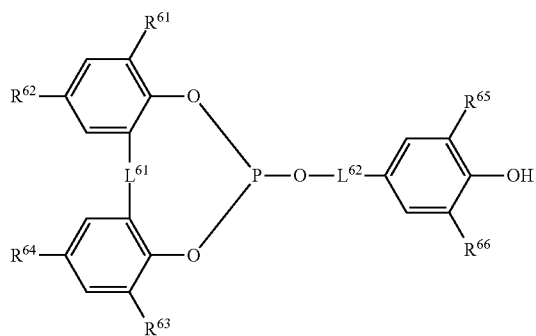

General Formula (P3)

In the General Formula (P3), $R^{61}$, $R^{62}$, $R^{63}$, $R^{64}$, $R^{65}$, and $R^{66}$ each independently represent a hydrogen atom or an alkyl group having 1 to 12 carbon atoms, and $L^{61}$ and $L^{62}$ each independently represent a single bond or a divalent linking group.

The alkyl group having 1 to 12 carbon atoms represented by $R^{61}$ is preferably an alkyl group having 1 to 10 carbon atoms, and more preferably an alkyl group having 1 to 9 carbon atoms. The alkyl group having 1 to 12 carbon atoms represented by $R^{61}$ may be linear, branched or cyclic, and is preferably a linear or branched alkyl group.

Specific examples of the alkyl group having 1 to 12 carbon atoms represented by $R^{61}$ include a methyl group, an ethyl group, an n-propyl group, an isopropyl group, an n-butyl group, a sec-butyl group, an isobutyl group, a tert-butyl group, an n-pentyl group, an isopentyl group, a neopentyl group, a tert-pentyl group, an n-hexyl group, an isohexyl group, a sec-hexyl group, a tert-hexyl group, a heptyl group, an isoheptyl group, a sec-heptyl group, a tert-heptyl group, an n-octyl group, an isooctyl group, a sec-octyl group, a tert-octyl group, an n-nonyl group, an isononyl group, a sec-nonyl group, a tert-nonyl group, an n-decyl group, an isodecyl group, a sec-decyl group, a tert-decyl group, an n-undecyl group, an isoundecyl group, a sec-dodecyl group, a tert-dodecyl group, an n-dodecyl group, an isododecyl group, a sec-dodecyl group, and a tert-dodecyl group.

Examples of the alkyl group having 1 to 12 carbon atoms represented by $R^{62}$ include the same forms as those described for $R^{61}$.

Examples of the alkyl group having 1 to 12 carbon atoms represented by $R^{63}$ include the same forms as those described for $R^{61}$.

Examples of the alkyl group having 1 to 12 carbon atoms represented by $R^{64}$ include the same forms as those described for $R^{61}$.

Examples of the alkyl group having 1 to 12 carbon atoms represented by $R^{65}$ include the same forms as those described for $R^{61}$.

Examples of the alkyl group having 1 to 12 carbon atoms represented by $R^{66}$ include the same forms as those described for $R^{61}$.

The group represented by $R^{61}$ is preferably a hydrogen atom, a methyl group or a tert-butyl group.

The group represented by $R^{62}$ is preferably an alkyl group having 1 to 9 carbon atoms, more preferably a methyl group or a tert-butyl group, and still more preferably a tert-butyl group.

The group represented by $R^{63}$ is preferably a hydrogen atom, a methyl group or a tert-butyl group.

The group represented by $R^{64}$ is preferably an alkyl group having 1 to 9 carbon atoms, more preferably a methyl group or a tert-butyl group, and still more preferably a tert-butyl group.

The group represented by $R^{65}$ is preferably a hydrogen atom, a methyl group, a tert-butyl group or a tert-pentyl group.

The group represented by $R^{66}$ is preferably a hydrogen atom, a methyl group, a tert-butyl group or a tert-pentyl group.

It is preferable that at least one of $R^{65}$ and $R^{66}$ is an alkyl group, and the alkyl group is preferably a tert-butyl group or a tert-pentyl group.

Examples of the divalent linking group represented by $L^{61}$ include an alkylene group, preferably an alkylene group having 1 to 3 carbon atoms, and more preferably an alkylene group having 1 or 2 carbon atoms.

$L^{61}$ is particularly preferably a single bond or a methylene group.

Examples of the divalent linking group represented by $L^{62}$ include an alkylene group or an arylene group, preferably an alkylene group or a phenylene group having 1 to 6 carbon atoms, and more preferably an alkylene group or a phenylene group having 1 to 4 carbon atoms.

Specific examples of the compound represented by the General Formula (P3) include "Sumilizer GP" manufactured by Sumitomo chemical Co., Ltd.

—Hydroxylamine Compound—

The hydroxylamine compound In the exemplary embodiment refers to a compound having a structure in which at least one hydroxy group is directly bonded to a nitrogen atom of an amine. The hydroxylamine compound is preferably N,N-dialkylhydroxylamine.

Examples of the hydroxylamine compound include a compound represented by the following General Formula (HA1).

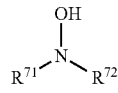

General Formula (HA1)

In the General Formula (HA1), $R^{71}$ and $R^{72}$ each independently represent an alkyl group having 14 to 20 carbon atoms.

The alkyl group having 14 to 20 carbon atoms represented by $R^{71}$ may be any one of a linear alkyl group, a branched alkyl group and an alkyl group containing an alicyclic ring, preferably a linear or branched alkyl group, and more preferably a linear alkyl group.

When the alkyl group having 14 to 20 carbon atoms represented by $R^{71}$ is branched, the number of branched chains in the group is preferably 1 to 3, more preferably 1 or 2, and still more preferably 1.

The alkyl group having 14 to 20 carbon atoms represented by $R^{71}$ is preferably a linear or branched alkyl group having 16 to 18 carbon atoms, and particularly preferably a linear alkyl group having 16 to 18 carbon atoms.

The specific form and preferred form of the group represented by $R^{72}$ are the same as those described for $R^{71}$.

Specific examples of the alkyl group having 14 to 20 carbon atoms represented by $R^{71}$ and $R^{72}$ are shown below.

| $R^{71}, R^{72}$ | | |
|---|---|---|
| Linear | Branched | |
| $-C_{13}H_{26}CH_3$ | $-C_{11}H_{22}-CH(CH_3)_2$ | $-CH(CH_3)-C_{11}H_{22}CH_3$ |
| $-C_{14}H_{28}CH_3$ | $-C_{13}H_{26}-CH(CH_3)_2$ | $-CH(CH_3)-C_{13}H_{26}CH_3$ |
| $-C_{15}H_{30}CH_3$ | $-C_{14}H_{28}-CH(CH_3)_2$ | $-CH(CH_3)-C_{14}H_{28}CH_3$ |
| $-C_{16}H_{32}CH_3$ | $-C_{15}H_{30}-CH(CH_3)_2$ | $-CH(CH_3)-C_{15}H_{30}CH_3$ |
| $-C_{17}H_{34}CH_3$ | $-C_{17}H_{34}-CH(CH_3)_2$ | $-CH(CH_3)-C_{17}H_{34}CH_3$ |
| $-C_{18}H_{36}CH_3$ | $-C_{10}H_{20}-C(CH_3)_3$ | $-CH_2-CH(CH_3)-C_{10}H_{20}CH_3$ |
| $-C_{19}H_{38}CH_3$ | $-C_{12}H_{24}-C(CH_3)_3$ | $-CH_2-CH(CH_3)-C_{12}H_{24}CH_3$ |
| | $-C_{14}H_{28}-C(CH_3)_3$ | $-CH_2-CH(CH_3)-C_{14}H_{28}CH_3$ |
| | $-C_{16}H_{32}-C(CH_3)_3$ | $-CH_2-CH(CH_3)-C_{16}H_{32}CH_3$ |
| | $-C_3H_6-CH(CH_3)-C_3H_6-CH(CH_3)-C_5H_{10}CH_3$ | |
| | $-C_3H_6-CH(CH_3)-C_3H_6-CH(CH_3)-C_7H_{14}CH_3$ | |

Specific examples of the compound represented by the General Formula (HA1) include "Irgastab FS-042" manufactured by BASF.

The compound (F) may be used alone, or may be used in combination of two or more thereof. The form of using two or more of the compound (e3) in combination include a form using two or more of the compound (e3) within the same family in combination (for example, within the hindered phenol compound), or a form using two or more of the compound (e3) within different families in combination (for example, the hindered phenol compound and the tocopherol compound).

The form of using two or more kinds of the compound (C) in combination is preferably a form in which at least one selected from the group consisting of a hindered phenol compound and a hydroxylamine compound and at least one selected from phosphite compounds are used in combination.

[Content or Mass Ratio of Components (A) to (F)]

The content or mass ratio of each component is described. The content or mass ratio of each component is preferably in the following range from the viewpoint of shortening the solidification time (cycle time) and improving the rigidity of the resin molded article. The abbreviation of each component is as follows.

Component (A)=resin (A) having a biomass-derived carbon atom
Component (B)=resin (B) incompatible with the resin (A)
Component (C)=plasticizer (C)

The content of the component (A) is larger than that of the component (B). When the content of the component (A) is larger, the solidification time (cycle time) is shortened and the rigidity of the resin molded article is improved.

The mass ratio [(A)/(B)] of the component (A) to component (B) is preferably 95/5 to 70/30, more preferably 93/7 to 75/25, and still more preferably 92/8 to 80/20.

The mass ratio [(A)/(C)] of the component (A) to component (C) is preferably 97/3 to 75/25, more preferably 95/5 to 80/20, and still more preferably 92/8 to 85/15.

The mass ratio [(B)/(C)] of the component (B) to component (C) is preferably 86/14 to 25/75, more preferably 80/20 to 30/70, and still more preferably 75/25 to 35/65.

The content of the component (A) in the resin composition according to the exemplary embodiment is preferably 50 mass % or more, more preferably 60 mass % or more, and still more preferably 70 mass % or more, based on the total amount of the resin composition.

The content of the component (B) in the resin composition according to the exemplary embodiment is preferably 1 mass % to 30 mass %, more preferably 3 mass % to 25 mass %, and still more preferably 5 mass % to 20 mass %, based on the total amount of the resin composition.

The content of the component (C) in the resin composition according to the exemplary embodiment is preferably 0.01 mass % to 5 mass %, more preferably 0.05 mass % to 2 mass %, and still more preferably 0.1 mass % to 1 mass %, based on the total amount of the resin composition.

The content or mass ratio of other additives is preferably in the following range. The abbreviation of each component is as follows.

Component (D)=thermoplastic elastomer (D)
Component (E)=ester compound (E)
Component (F)=at least one compound (F) selected from the group consisting of a hindered phenol compound, a tocopherol compound, a tocotrienol compound, a phosphite compound and a hydroxylamine compound The content of the component (D) in the resin composition according to the exemplary embodiment is preferably 1 mass % to 20 mass %, more preferably 3 mass % to 15 mass %, and still more preferably 5 mass % to 10 mass %, based on the total amount of the resin composition.

The content ratio of the component (D) to the component (A) is preferably $0.025 \leq (D)/(A) \leq 0.3$, more preferably $0.05 \leq (D)/(A) \leq 0.2$, and still more preferably $0.06 \leq (D)/(A) \leq 0.15$.

The content of the component (E) in the resin composition according to the exemplary embodiment is preferably 0.1 mass % to 15 mass %, more preferably 0.5 mass % to 10 mass %, and still more preferably 1 mass % to 5 mass %, based on the total amount of the resin composition.

The content ratio of the component (E) to the component (A) is preferably $0.002 \leq (E)/(A) \leq 0.2$, more preferably $0.0025 \leq (E)/(A) \leq 0.1$, and still more preferably $0.005 \leq (E)/(A) \leq 0.05$.

The content of the component (F) in the resin composition according to the exemplary embodiment is preferably 0.01 mass % to 5 mass %, more preferably 0.05 mass % to 2 mass %, and still more preferably 0.1 mass % to 1 mass %, based on the total amount of the resin composition.

The content ratio of the component (F) to the component (A) is preferably $0.0001 \leq (F)/(A) \leq 0.075$, more preferably $0.0005 \leq (F)/(A) \leq 0.03$, and still more preferably $0.001 \leq (F)/(A) \leq 0.015$.

[Other Components]

The resin composition according to the exemplary embodiment may contain other components.

Examples of other components include a flame retardant, a compatibilizer, an antioxidant, a releasing agent, a light fastness agent, a weathering agent, a colorant, a pigment, a modifier, a drip inhibitor, an antistatic agent, a hydrolysis inhibitor, a filler, a reinforcing agent (glass fibers, carbon fibers, talc, clay, mica, glass flakes, milled glass, glass beads, crystalline silica, alumina, silicon nitride, aluminum nitride, boron nitride, etc.), or the like.

In addition, if necessary, components (additives) such as an acid acceptor and a reactive trapping agent for preventing release of acetic acid may be added. Examples of the acid acceptor include: oxides such as magnesium oxide and aluminum oxide; metal hydroxides such as magnesium hydroxide, calcium hydroxide, aluminum hydroxide, and hydrotalcite; calcium carbonate; talc; or the like.

Examples of the reactive trapping agent include an epoxy compound, an acid anhydride compound, a carbodiimide, or the like.

The content of these components is preferably 0 mass % to 5 mass % based on the entire resin composition, respectively. Here, "0 mass %" means not containing other components.

The resin composition according to the exemplary embodiment may contain a resin other than the resin (such as the bio-resin (A) and the resin (B)). However, in the case of containing other resins, the content of other resins based on the total amount of the resin composition is preferably 5 mass % or less, and preferably less than 1 mass %. It is more preferable to not contain other resins (that is, 0 mass %).

Examples of other resins include thermoplastic resins known in the related art, and specifically include: a polycarbonate resin; a polypropylene resin; a polyester resin; a polyolefin resin; a polyester carbonate resin; a polyphenylene ether resin; a polyphenylene sulfide resin; a polysulfone resin; a polyether sulfone resin; a polyarylene resin; a polyether imide resin; a polyacetal resin; a polyvinyl acetal resin; a polyketone resin; a polyether ketone resin; a polyether ether ketone resin; a polyaryl ketone resin; a polyether nitrile resin; a liquid crystal resin; a polybenzimidazole resin; a polyparabanic acid resin; a vinyl polymer or copolymer obtained by polymerizing or copolymerizing one or more vinyl monomers selected from the group consisting of an aromatic alkenyl compound, a methacrylic acid ester, an acrylic acid ester, and a vinyl cyanide compound; a diene-aromatic alkenyl compound copolymer; a vinyl cyanide-diene-aromatic alkenyl compound copolymer; an aromatic alkenyl compound-diene-vinyl cyanide-N-phenyl maleimide copolymer; a vinyl cyanide-(ethylene-diene-propylene (EPDM))-aromatic alkenyl compound copolymer; a vinyl chloride resin; a chlorinated vinyl chloride resin; or the like. The above resin may be used alone, or may be used in combination of two or more thereof.

[Method for Producing Resin Composition]

The resin composition according to the exemplary embodiment is produced by melt-kneading a mixture containing, for example, the bio-resin (A), the resin (B) and the plasticizer (C), if necessary, other additives (such as the thermoplastic elastomer (D), the ester compound (E) and the compound (F)) and other components. Besides, the resin composition according to the exemplary embodiment may also be produced, for example, by dissolving the above components in a solvent.

Examples of methods for melt-kneading includes known means, and specific examples thereof include a twin-screw extruder, a Henschel mixer, a Banbury mixer, a single screw extruder, a multi-screw extruder, a co-kneader or the like.

<Resin Molded Article>

The resin molded article according to the exemplary embodiment contains the resin composition according to the exemplary embodiment. That is, the resin molded article according to the exemplary embodiment has the same composition as the resin composition according to the exemplary embodiment.

The method for forming a resin molded article according to the exemplary embodiment is preferably injection molding from the viewpoint of a high degree of freedom of shape. From this viewpoint, the resin molded article is preferably an injection molded body obtained by injection molding.

The cylinder temperature of injection molding is, for example, 160° C. to 280° C., and preferably 180° C. to 260° C. The mold temperature of the injection molding is, for example, 40° C. to 90° C., and more preferably 60° C. to 80° C.

The injection molding is performed, for example, by using commercial devices such as NEX 500 manufactured by NISSEI PLASTIC INDUSTRIAL CO., LTD., NEX 150 manufactured by NISSEI PLASTIC INDUSTRIAL CO., LTD., NEX 7000 manufactured by NISSEI PLASTIC INDUSTRIAL CO., LTD., PNX 40 manufactured by NISSEI PLASTIC INDUSTRIAL CO., LTD., and SE5OD manufactured by Sumitomo Heavy Industries, Ltd.

The molding method for obtaining the resin molded article according to the exemplary embodiment is not limited to the above injection molding, and injection molding, extrusion molding, blow molding, hot press molding, calender molding, coating molding, cast molding, dipping molding, vacuum molding, transfer molding or the like may also be applied.

The resin molded article according to the exemplary embodiment is suitably used for applications such as electronic and electrical equipment, office equipment, household electric appliances, automotive interior materials, toys, containers, carriers, adsorbents, separation membranes, or the like. More specifically, casings of electronic/electric devices or household electric appliances; various parts of electronic/electric devices or home electric appliances; interior parts of automobiles; block assembled toys; plastic model kits; CD-ROM or DVD storage cases; dishware; beverage bottles; food trays; wrapping materials; films; sheets; catalyst carriers; water absorbing materials; humidity adjusting materials; or the like.

EXAMPLES

Hereinafter, the present invention is described in more detail with reference to examples, but the present invention is not limited to these examples. Unless otherwise specified, "part" indicates "part by mass".

<Preparation of Each Material>

The following materials are prepared.

(Preparation of Bio-Resin (A))

CA1: "CAP 482-20 (Eastman Chemical Company)", cellulose acetate propionate, Tg=144° C., having a weight-average polymerization degree of 716, an acetyl group degree of substitution of 0.18 and a propionyl group degree of substitution of 2.49.

CA2: "CAP 504-0.2 (Eastman Chemical Company)", cellulose acetate propionate, Tg=159° C., having a weight-average polymerization degree of 133, an acetyl group degree of substitution of 0.04 and a propionyl group degree of substitution of 2.09.

CA3: "CAB 171-15 (Eastman Chemical Company)", cellulose acetate butyrate, Tg=161° C., having a weight-average polymerization degree of 754, an acetyl group degree of substitution of 2.07 and a butyryl group degree of substitution of 0.73.

CA4: "L-50 (Daicel)", diacetyl cellulose, Tg=189° C., having a weight-average polymerization degree of 570.

CA5: "CA 398-3 (Eastman Chemical Company)" diacetyl cellulose, Tg=180° C., having a weight-average polymerization degree of 297.

RC1: "Tenite propionate 360A4000012 (Eastman Chemical Company)", cellulose acetate propionate, Tg=144° C., having a weight-average polymerization degree of 716, an acetyl group degree of substitution of 0.18 and a propionyl group degree of substitution of 2.49. The product contained "Dioctyl adipate (DOA)" (corresponding to component (C)), and the content of cellulose acetate propionate is 88 mass % and the amount of dioctyl adipate is 12 mass %.

RC2: "Treva GC6021 (Eastman Chemical Company)", cellulose acetate propionate, Tg=138° C., having a weight-average polymerization degree of 716, an acetyl group degree of substitution of 0.18 and a propionyl group degree of substitution of 2.49. The product contains a chemical substance corresponding to component (D), and the content is 3 mass % to 10 mass %.

PE2: "GLOBIO BCB80 (Braskem S. A.)", bio-PET, Tg=80° C.

PA1: "Xecot XN400 (Unitika Ltd.)" polyamide 10T, Tg=160° C.

PC1: "Durabio D7340R (Mitsubishi Chemical Corporation)" bio-polycarbonate, Tg=125° C.

CA1 satisfied the following (2), (3) and (4). CA2 satisfied the following (4). (2) When measured by the GPC method using tetrahydrofuran as a solvent, the weight average molecular weight (Mw) in terms of polystyrene is 160,000 to 250,000, a ratio Mn/Mz of a number average molecular weight (Mn) in terms of polystyrene to a Z average molecular weight (Mz) in terms of polystyrene is 0.14 to 0.21, and a ratio Mw/Mz of a weight average molecular weight (Mw) in terms of polystyrene to the Z average molecular weight (Mz) in terms of polystyrene is 0.3 to 0.7. (3) When measured with a Capirograph at a condition of 230° C. according to ISO 11443:1995, a ratio η1/η2 of a viscosity η1 (Pa·s) at a shear rate of 1216 (/sec) to a viscosity η2 (P·s) at a shear rate of 121.6 (/sec) is 0.1 to 0.3. (4) When a small square plate test piece (D11 test piece specified by JIS K7139:2009, 60 mm×60 mm, thickness 1 mm) obtained by injection molding of the CAP is allowed to stand in an atmosphere at a temperature of 65° C. and a relative humidity of 85% for 48 hours, both an expansion coefficient in an MD direction and an expansion coefficient in a TD direction are 0.4% to 0.6%.

(Preparation of Resin (B))

PE1: "Ingeo 3001D (Nature Works)", polylactic acid, Tg=58° C.

PM1: "DELPET 720V (Asahi Kasei)", polymethyl methacrylate (PMMA), Tg=108° C.

AS1: "ZFJS (Techno-UMG Co., Ltd.)", acrylonitrile-butadiene-styrene copolymer resin (ABS), Tg=111° C.

AS2: "Panlite L-1225L (Teijin Ltd.)", polycarbonate, Tg=150° C.

AS3: "TRN-MTJ (Teijin Ltd.)", polyethylene terephthalate, Tg=69° C.

CA4: "L-50 (Daicel)", diacetyl cellulose, Tg=189° C., having a weight-average polymerization degree of 570.

(Preparation of Plasticizer (C))

PL1: "NX-2026 (Cardolite Corporation)", cardanol, having a molecular weight of 298 to 305.

PL2: "CITROFOL AHII (Jungbunzlauer)", acetyl 2-ethylhexyl citrate, having a molecular weight of 571.

PL4: "Ultra LITE 513 (Cardolite Corporation)", gadidyl ether of cardanol, having a molecular weight of 354 to 361.

PL5: "JP120 (Mitsubishi Chemical Corporation)", glycol benzoate, having a molecular weight of 327.

PL6: "Daifatty 101 (DAIHACHI CHEMICAL INDUSTRY CO., LTD.)", an adipate ester-containing compound, adipate ester having a molecular weight of 326 to 378.

PL7: "PEG #400 (NOF)", polyethylene glycol, having a molecular weight of about 400.

(Preparation of Other Additives)

EL1: "METABLEN W-600A (Mitsubishi Chemical Corporation)", core-shell structure polymer, a shell layer polymer obtained by grafting and polymerizing "a homopolymer rubber of methyl methacrylate and 2-ethylhexyl acrylate" to "a copolymer rubber of 2-ethylhexyl acrylate and n-butyl acrylate" as a core layer, having an average primary particle diameter of 200 nm.

LU1: "Stearyl stearate (FUJIFILM Wako Pure Chemical Industries)", stearyl stearate (a compound represented by the General Formula (1), $R^{11}$ having 17 carbon atoms, and $R^{12}$ having 18 carbon atoms).

ST1: "Irganox B225 (BASF)", a mixture of pentaerythritol tetrakis(3-(3,5-di-t-butyl-4-hydroxyphenyl)propionate) and tris(2,4-di-t-butylphenyl) phosphite.

Examples 1 to 33 and Comparative Examples 1 to 3

(Kneading and Injection Molding)

Kneading is performed with a twin-screw kneader (LTE 20-44, manufactured by labtech engineering) at the charged composition ratios shown in Tables 1 and 2 and kneading temperatures (cylinder temperatures) shown in Tables 3 and 4, to obtain a resin composition (pellet).

The obtained pellet is used to mold the following resin molded articles (1) to (3) with an injection molding machine (NEX500I, manufactured by NISSEI PLASTIC INDUSTRIAL CO., LTD.) at an injection peak pressure not exceeding 180 NiPa and at molding temperatures (cylinder temperatures) and mold temperatures shown in Table 3 and Table 4.

(1): D12 test piece (dimension: 60 mm×60 mm×thickness 2 mm)

(2): D11 test piece (dimension: 60 mm×60 mm×thickness 1 mm)

(3): ISO multipurpose test piece (dumbbell shape, test part: width 10 mm and thickness 4 mm)

<Measurement of Content of Biomass-Derived Carbon Atom>

Using the obtained pellet-like resin composition, the content of $^{14}C$ in the total amount of carbon atoms in the resin composition is measured and the content of the biomass-derived carbon atom is calculated based on the provisions of ASTM D6866:2012. The results are shown in the column of "content of biomass-derived carbon atom" in Table 3 and Table 4.

<Evaluation>

The obtained resin molded articles are evaluated as follows. The evaluation results are shown in Table 5 and Table 6.

(Cycle Time (Solidification Time))

The time required from the start of injection to the start of injection of the next molded product in molding the D2 test piece is measured and taken as the cycle time.

(Flexural Modulus)

With respect to the ISO multipurpose test piece obtained, the flexural modulus (MPa) is measured by a method in accordance with ISO 178 using a universal testing device (Autograph AG-Xplus, manufactured by Shimadzu Corporation).

[DuPont Impact Test (Surface Impact Strength)]

The obtained D12 test piece is subject to a DuPont impact test using a hammer having a diameter of 6.3 mm and a weight of 1 kg. The relationship between the height at which the weight is dropped and the state of the D12 test piece after the drop is observed.

Apparatus: DuPont Impact Tester H-50 (manufactured by Toyo Seiki Seisaku-sho, Ltd.)
Standard: ISO 6272 (1993)
Conditions: Height 100 mm, 200 mm, 300 mm
The evaluation criteria are as follows.
A: no fracture nor crack
B: fracture but no crack
C: crack
D: test piece is broken into two pieces

TABLE 1

| | | Component (A) Bio-resin | | Component (B) Other resins | | | | Component (C) Plasticizer | | Other additives | | | | | |
|---|---|---|---|---|---|---|---|---|---|---|---|---|---|---|---|
| | | Type | (Part) | Type | (Part) | Type | (Part) | Type | (Part) | Type | (Part) | Type | (Part) | Type | (Part) |
| Examples | 1 | CA1 | 91.5 | PE1 | 10 | | | PL1 | 8.5 | EL1 | 7.5 | | | ST1 | 0.5 |
| | 2 | CA1 | 91.5 | PE1 | 5 | PM1 | 5 | PL1 | 8.5 | EL1 | 7.5 | LU1 | 2 | ST1 | 0.5 |
| | 3 | RC2 | 100 | PE1 | 10 | | | PL4 | 5 | | | | | ST1 | 0.5 |
| | 4 | RC1 | 100 | | | PM1 | 15 | | | EL1 | 5 | | | ST1 | 0.5 |
| | 5 | RC2 | 100 | PE1 | 5 | PM1 | 5 | PL1 | 10 | EL1 | 10 | | | ST1 | 0.5 |
| | 6 | RC1 | 100 | PE1 | 5 | PM1 | 5 | PL1 | 2 | EL1 | 2 | | | ST1 | 0.5 |
| | 7 | CA2 | 91.5 | PE1 | 5 | | | PL1 | 8.5 | EL1 | 7.5 | | | ST1 | 0.5 |
| | 8 | CA3 | 91.5 | PE1 | 5 | | | PL1 | 8.5 | EL1 | 7.5 | | | ST1 | 0.5 |
| | 9 | CA4 | 85 | | | PM1 | 10 | PL1 | 15 | EL1 | 7.5 | | | ST1 | 0.5 |
| | 10 | CA5 | 85 | PE1 | 5 | PM1 | 10 | PL6 | 15 | EL1 | 7.5 | | | ST1 | 0.5 |
| | 11 | CA1 | 91.5 | PE1 | 5 | PM1 | 5 | PL4 | 8.5 | EL1 | 7.5 | | | ST1 | 0.5 |
| | 12 | CA1 | 91.5 | PE1 | 5 | PM1 | 5 | PL6 | 8.5 | EL1 | 7.5 | | | ST1 | 0.5 |
| | 13 | CA1 | 88 | PE1 | 5 | PM1 | 5 | PL6 | 12 | EL1 | 10 | | | ST1 | 0.5 |
| | 14 | CA1 | 97 | PE1 | 1.5 | PM1 | 1.5 | PL1 | 8.5 | EL1 | 7.5 | | | ST1 | 0.5 |
| | 15 | CA1 | 93 | PE1 | 3.5 | PM1 | 3.5 | PL1 | 8.5 | EL1 | 7.5 | | | ST1 | 0.5 |
| | 16 | CA1 | 75 | PE1 | 12.5 | PM1 | 12.5 | PL1 | 8.5 | EL1 | 7.5 | | | ST1 | 0.5 |
| | 17 | CA1 | 65 | PE1 | 17.5 | PM1 | 17.5 | PL1 | 12 | EL1 | 7.5 | | | ST1 | 0.5 |
| | 18 | CA1 | 98 | PE1 | 15 | PM1 | 15 | PL1 | 2 | EL1 | 7.5 | | | ST1 | 0.5 |

TABLE 2

| | | Component (A) Bio-resin | | Component (B) Other resins | | | | Component (C) Plasticizer | | Other additives | | | | | |
|---|---|---|---|---|---|---|---|---|---|---|---|---|---|---|---|
| | | Type | (Part) | Type | (Part) | Type | (Part) | Type | (Part) | Type | (Part) | Type | (Part) | Type | (Part) |
| Examples | 19 | CA1 | 95 | PE1 | 5 | PM1 | 5 | PL1 | 5 | EL1 | 7.5 | | | ST1 | 0.5 |
| | 20 | CA1 | 87 | PE1 | 5 | PM1 | 5 | PL1 | 10 | EL1 | 7.5 | | | ST1 | 0.5 |
| | 21 | CA1 | 80 | PE1 | 5 | PM1 | 5 | PL1 | 20 | | | | | ST1 | 0.5 |
| | 22 | CA1 | 96 | PE1 | 15 | PM1 | 15 | PL1 | 4 | EL1 | 7.5 | | | ST1 | 0.5 |
| | 23 | CA1 | 98 | PE1 | 5 | PM1 | 5 | PL1 | 2 | EL1 | 7.5 | | | ST1 | 0.5 |
| | 24 | CA4 | 100 | PE1 | 5 | PM1 | 5 | PL1 | 20 | EL1 | 7.5 | | | | |
| | 25 | CA4 | 100 | PE1 | 5 | PM1 | 5 | PL1 | 35 | | | | | ST1 | 0.5 |
| | 26 | PE2 | 91.5 | PE1 | 10 | | | PL1 | 8.5 | EL1 | 7.5 | | | ST1 | 0.5 |
| | 27 | PA1 | 91.5 | PE1 | 5 | | | PL1 | 8.5 | EL1 | 7.5 | | | ST1 | 0.5 |
| | 28 | PC1 | 91.5 | PE1 | 5 | | | PL1 | 8.5 | EL1 | 7.5 | | | | |
| | 29 | CA1 | 90 | AS1 | 10 | | | PL1 | 5 | | | | | ST1 | 0.5 |
| | 30 | CA1 | 90 | AS3 | 10 | | | PL1 | 5 | | | | | ST1 | 0.5 |
| | 31 | CA1 | 90 | PE1 | 5 | PM1 | 5 | PL2 | 10 | | | | | ST1 | 0.5 |
| | 32 | CA1 | 90 | PE1 | 5 | PM1 | 5 | PL5 | 10 | EL1 | 7.5 | | | ST1 | 0.5 |
| | 33 | CA1 | 90 | PE1 | 5 | PM1 | 5 | PL7 | 10 | | | | | ST1 | 0.5 |
| Comparative Examples | 1 | CA1 | 90 | AS2 | 10 | | | PL1 | 10 | | | | | ST1 | 0.5 |
| | 2 | PE2 | 91.5 | CA4 | 5 | | | PL1 | 8.5 | EL1 | 7.5 | | | ST1 | 0.5 |
| | 3 | CA1 | 90 | PE1 | 5 | PM1 | 5 | | | EL1 | 7.5 | | | ST1 | 0.5 |

TABLE 3

| | | Conditions | | | Properties | | | | | | | |
|---|---|---|---|---|---|---|---|---|---|---|---|---|
| | | Kneading temperature (° C.) | Molding temperature (° C.) | Mold temperature (° C.) | Content of biomass-derived carbon atom (%) | Tg(A) (° C.) | Tg(A + C) (° C.) | Tg(A) − Tg(A + C) (° C.) | Tg(B) (° C.) | Tg(B + C) (° C.) | Tg(B) − Tg(B + C) (° C.) | [Tg(B) − Tg(B + C)]/ [Tg(A) − Tg(A + C)] |
| Examples | 1 | 200 | 200 | 40 | 50.7 | 144 | 94 | 50 | 58 | 33 | 25 | 0.50 |
| | 2 | 200 | 200 | 40 | 47.8 | 144 | 94 | 50 | 74 | 48 | 26 | 0.52 |
| | 3 | 230 | 230 | 40 | 42.8 | 138 | 90 | 48 | 58 | 33 | 25 | 0.52 |
| | 4 | 200 | 200 | 40 | 30 | 144 | 98 | 46 | 108 | 75 | 33 | 0.72 |
| | 5 | 200 | 200 | 40 | 36.1 | 138 | 85 | 53 | 74 | 48 | 26 | 0.49 |
| | 6 | 220 | 220 | 40 | 38.3 | 144 | 93 | 51 | 74 | 48 | 26 | 0.51 |
| | 7 | 200 | 200 | 40 | 48.7 | 159 | 117 | 42 | 58 | 33 | 25 | 0.60 |
| | 8 | 200 | 200 | 40 | 52.7 | 161 | 124 | 37 | 58 | 33 | 25 | 0.68 |
| | 9 | 220 | 220 | 60 | 54.8 | 189 | 154 | 35 | 108 | 75 | 33 | 0.94 |
| | 10 | 220 | 220 | 60 | 39.2 | 180 | 151 | 29 | 74 | 50 | 24 | 0.83 |
| | 11 | 200 | 200 | 40 | 44.7 | 144 | 98 | 46 | 74 | 48 | 26 | 0.57 |
| | 12 | 200 | 200 | 40 | 36.4 | 144 | 96 | 48 | 74 | 50 | 24 | 0.50 |
| | 13 | 180 | 180 | 60 | 34.2 | 144 | 96 | 48 | 74 | 50 | 24 | 0.50 |
| | 14 | 210 | 210 | 40 | 46.5 | 144 | 94 | 50 | 74 | 48 | 26 | 0.52 |
| | 15 | 210 | 210 | 40 | 46.5 | 144 | 94 | 50 | 74 | 48 | 26 | 0.52 |
| | 16 | 210 | 210 | 40 | 46.8 | 144 | 94 | 50 | 74 | 48 | 26 | 0.52 |
| | 17 | 210 | 210 | 40 | 49.4 | 144 | 94 | 50 | 74 | 48 | 26 | 0.52 |
| | 18 | 230 | 230 | 60 | 42.1 | 144 | 94 | 50 | 74 | 48 | 26 | 0.52 |

TABLE 4

| | | Conditions | | | Properties | | | | | | | |
|---|---|---|---|---|---|---|---|---|---|---|---|---|
| | | Kneading temperature (° C.) | Molding temperature (° C.) | Mold temperature (° C.) | Content of biomass-derived carbon atom (%) | Tg(A) (° C.) | Tg(A + C) (° C.) | Tg(A) − Tg(A + C) (° C.) | Tg(B) (° C.) | Tg(B + C) (° C.) | Tg(B) − Tg(B + C) (° C.) | [Tg(B) − Tg(B + C)]/ [Tg(A) − Tg(A + C)] |
| Examples | 19 | 220 | 220 | 40 | 43.9 | 144 | 94 | 50 | 74 | 48 | 26 | 0.52 |
| | 20 | 200 | 200 | 40 | 47.7 | 144 | 94 | 50 | 74 | 48 | 26 | 0.52 |
| | 21 | 190 | 190 | 40 | 58.5 | 144 | 94 | 50 | 74 | 48 | 26 | 0.52 |
| | 22 | 220 | 220 | 40 | 43.5 | 144 | 94 | 50 | 74 | 48 | 26 | 0.52 |
| | 23 | 230 | 230 | 60 | 41.6 | 144 | 94 | 50 | 74 | 48 | 26 | 0.52 |
| | 24 | 220 | 220 | 60 | 58.6 | 189 | 154 | 35 | 74 | 48 | 26 | 0.74 |
| | 25 | 210 | 210 | 60 | 66.7 | 189 | 154 | 35 | 74 | 48 | 26 | 0.74 |
| | 26 | 270 | 270 | 20 | 30.2 | 80 | 52 | 28 | 74 | 48 | 26 | 0.93 |
| | 27 | 330 | 330 | 120 | 57.5 | 160 | 114 | 46 | 58 | 33 | 25 | 0.54 |
| | 28 | 230 | 230 | 60 | 59.8 | 125 | 90 | 35 | 58 | 33 | 25 | 0.71 |
| | 29 | 230 | 230 | 40 | 43.2 | 144 | 94 | 50 | 111 | 105 | 6 | 0.12 |
| | 30 | 240 | 240 | 40 | 45.6 | 144 | 94 | 50 | 69 | 58 | 11 | 0.22 |
| | 31 | 210 | 210 | 40 | 40.5 | 144 | 94 | 50 | 74 | 63 | 11 | 0.22 |
| | 32 | 210 | 210 | 40 | 35.5 | 144 | 121 | 23 | 74 | 33 | 41 | 1.78 |
| | 33 | 210 | 210 | 40 | 39.3 | 144 | 82 | 62 | 74 | 54 | 20 | 0.32 |
| Comparative Examples | 1 | 220 | 220 | 40 | 44.4 | 144 | 94 | 50 | 150 | 105 | 45 | 0.90 |
| | 2 | 270 | 270 | 20 | 28.1 | 80 | 52 | 28 | 189 | 165 | 24 | 0.86 |
| | 3 | 220 | 220 | 40 | 39.7 | 144 | — | — | — | — | — | — |

TABLE 5

| | | Evaluation | | | | |
|---|---|---|---|---|---|---|
| | | Flexural Modulus (MPa) | Cycle time (s) | Surface impact strength | | |
| | | | | 100 mm | 200 mm | 300 mm |
| Examples | 1 | 2000 | 17 | A | A | A |
| | 2 | 1900 | 15 | A | A | A |
| | 3 | 2100 | 16 | A | A | A |
| | 4 | 1800 | 16 | A | A | A |
| | 5 | 1800 | 18 | A | A | B |
| | 6 | 2000 | 16 | A | A | A |
| | 7 | 1700 | 16 | A | A | A |
| | 8 | 2200 | 16 | A | A | A |
| | 9 | 2400 | 20 | A | A | B |
| | 10 | 2400 | 19 | A | A | B |
| | 11 | 1800 | 16 | A | A | A |
| | 12 | 1800 | 16 | A | A | A |

TABLE 5-continued

| | | Flexural Modulus (MPa) | Cycle time (s) | Surface impact strength 100 mm | Surface impact strength 200 mm | Surface impact strength 300 mm |
|---|---|---|---|---|---|---|
| | 13 | 1900 | 17 | A | A | A |
| | 14 | 1900 | 16 | A | B | B |
| | 15 | 1900 | 17 | A | A | B |
| | 16 | 2000 | 16 | A | A | B |
| | 17 | 1900 | 15 | A | B | B |
| | 18 | 2300 | 16 | A | B | B |

TABLE 6

| | | Flexural Modulus (MPa) | Cycle time (s) | Surface impact strength 100 mm | Surface impact strength 100 mm | Surface impact strength 100 mm |
|---|---|---|---|---|---|---|
| Examples | 19 | 2000 | 17 | A | A | B |
| | 20 | 1800 | 20 | A | A | A |
| | 21 | 1700 | 21 | A | A | A |
| | 22 | 2300 | 17 | A | B | B |
| | 23 | 2100 | 17 | A | A | B |
| | 24 | 2100 | 22 | A | A | A |
| | 25 | 2000 | 25 | A | A | A |
| | 26 | 2500 | 23 | A | B | B |
| | 27 | 2300 | 20 | A | A | A |
| | 28 | 2300 | 17 | A | A | A |
| | 29 | 1600 | 24 | B | C | C |
| | 30 | 1800 | 26 | C | B | C |
| | 31 | 1900 | 25 | C | C | C |
| | 32 | 1600 | 27 | B | C | C |
| | 33 | 1600 | 27 | A | B | B |
| Comparative Examples | 1 | 1500 | 29 | C | D | D |
| | 2 | 2400 | 29 | D | D | D |
| | 3 | 2200 | 29 | D | D | D |

From the above results shown in the tables, it is understood that a resin molded article having high rigidity may be obtained, a time required for solidification in molding the resin molded article is short and a resin molded article excellent in surface impact strength may be obtained in the resin compositions of Example compared with the resin compositions in Comparative Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
a resin (A) having a biomass-derived carbon atom;
a resin (B) incompatible with the resin (A); and
a plasticizer (C),
wherein a content of the resin (A) is larger than a content of the resin (B), and a glass transition temperature $T_{g(A)}$ of the resin (A) is higher than a glass transition temperature $T_{g(B)}$ of the resin (B),
wherein a difference $(T_{g(A)}-T_{g(A+C)})$ between the glass transition temperature $T_{g(A)}$ of the resin (A) and a glass transition temperature $T_{g(A+C)}$ of a mixture obtained by mixing 10 parts by mass of the plasticizer (C) with 90 parts by mass of the resin (A) is 25° C. to 60° C., and a difference $(T_{g(B)}-T_{g(B+C)})$ between the glass transition temperature $T_{g(B)}$ of the resin (B) and a glass transition temperature $T_{g(B+C)}$ of a mixture obtained by mixing 10 parts by mass of the plasticizer (C) with 90 parts by mass of the resin (B) is 15° C. to 40° C.

2. The resin composition according to claim 1,
wherein the content of the biomass-derived carbon atom in the resin composition defined in ASTM D6866:2012 is 30 mass % or more based on a total amount of carbon atoms in the resin composition.

3. The resin composition according to claim 2,
wherein the resin (A) is at least one selected from the group consisting of a cellulose acylate and an aliphatic polyester.

4. The resin composition according to claim 3,
wherein the resin (A) is at least one selected from the group consisting of cellulose acetate propionate and cellulose acetate butyrate.

5. The resin composition according to claim 1,
wherein the resin (A) is at least one selected from the group consisting of a cellulose acylate and an aliphatic polyester.

6. The resin composition according to claim 5,
wherein the resin (A) is at least one selected from the group consisting of cellulose acetate propionate and cellulose acetate butyrate.

7. The resin composition according to claim 1,
wherein the resin (A) comprises at least a cellulose acylate and the resin (B) comprises at least a polylactic acid.

8. The resin composition according to claim 1,
wherein a mass ratio (A)/(B) of the resin (A) to the resin (B) is 95/5 to 70/30.

9. The resin composition according to claim 1,
wherein a mass ratio (A)/(C) of the resin (A) to the plasticizer (C) is 97/3 to 75/25.

10. The resin composition according to claim 1,
wherein a mass ratio (A)/(C) of the resin (B) to the plasticizer (C) is 86/14 to 25/75.

11. The resin composition according to claim 1,
wherein the plasticizer (C) comprises at least one selected from the group consisting of a cardanol compound, a dicarboxylic acid diester, a citrate ester, a polyether compound having at least one unsaturated bond in the molecule, a polyetherester compound, a glycol benzoate, a compound represented by the following general formula (6) and an epoxidized fatty acid ester,

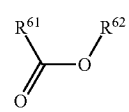

general formula (6)

wherein, in the general formula (6),
$R^{61}$ represents an aliphatic hydrocarbon group having 7 to 28 carbon atoms, and
$R^{62}$ represents an aliphatic hydrocarbon group having 1 to 8 carbon atoms.

12. A resin molded article, comprising the resin composition according to claim 1.

13. The resin molded article according to claim 12, wherein the resin molded article is an injection molded article.

\* \* \* \* \*